(12) United States Patent
Momose

(10) Patent No.: US 8,377,393 B2
(45) Date of Patent: Feb. 19, 2013

(54) MICROCHIP

(75) Inventor: Shun Momose, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1093 days.

(21) Appl. No.: 11/734,462

(22) Filed: Apr. 12, 2007

(65) Prior Publication Data

US 2007/0243111 A1    Oct. 18, 2007

(30) Foreign Application Priority Data

Apr. 14, 2006 (JP) ................................ 2006-111672

(51) Int. Cl.
*B01L 99/00* (2010.01)
(52) U.S. Cl. ......... 422/506; 422/502; 422/503; 422/504
(58) Field of Classification Search .......... 422/502–504, 422/506
See application file for complete search history.

(56) References Cited

U.S. PATENT DOCUMENTS

| | | | | |
|---|---|---|---|---|
| 4,676,274 A | * | 6/1987 | Brown | ............................ 137/806 |
| 5,958,694 A | * | 9/1999 | Nikiforov | ..................... 435/6.12 |
| 6,591,852 B1 | * | 7/2003 | McNeely et al. | ................. 137/14 |
| 7,259,021 B2 | * | 8/2007 | Colin | ............................. 436/180 |
| 2006/0002817 A1 | * | 1/2006 | Bohm et al. | ..................... 422/57 |

FOREIGN PATENT DOCUMENTS

| | | |
|---|---|---|
| JP | 11-257231 | 9/1999 |
| JP | 2001-503854 | 3/2001 |
| JP | 2003-270252 | 9/2003 |
| WO | WO 98/07019 | 2/1998 |

* cited by examiner

*Primary Examiner* — In Suk Bullock
*Assistant Examiner* — Paul Hyun
(74) *Attorney, Agent, or Firm* — Fish & Richardson P.C.

(57) ABSTRACT

There is provided a microchip having an introduction portion introducing a liquid, a valve, and an ejection portion ejecting the liquid. The valve connects the introduction portion and the ejection portion, and retains the liquid such that surface tension of the liquid prevents the liquid from being ejected to the ejection portion. The liquid can be ejected from the introduction portion to the ejection portion by applying to the liquid centrifugal force larger than the surface tension of the liquid. Such a microchip according to the present invention has a simple configuration and allows easy control of retaining and flowing of a liquid.

10 Claims, 14 Drawing Sheets

CHANNEL WIDTH DEPENDENCY OF LIQUID RETENTION POWER

CHANNEL WIDTH DEPENDENCY OF LIQUID RETENTION POWER

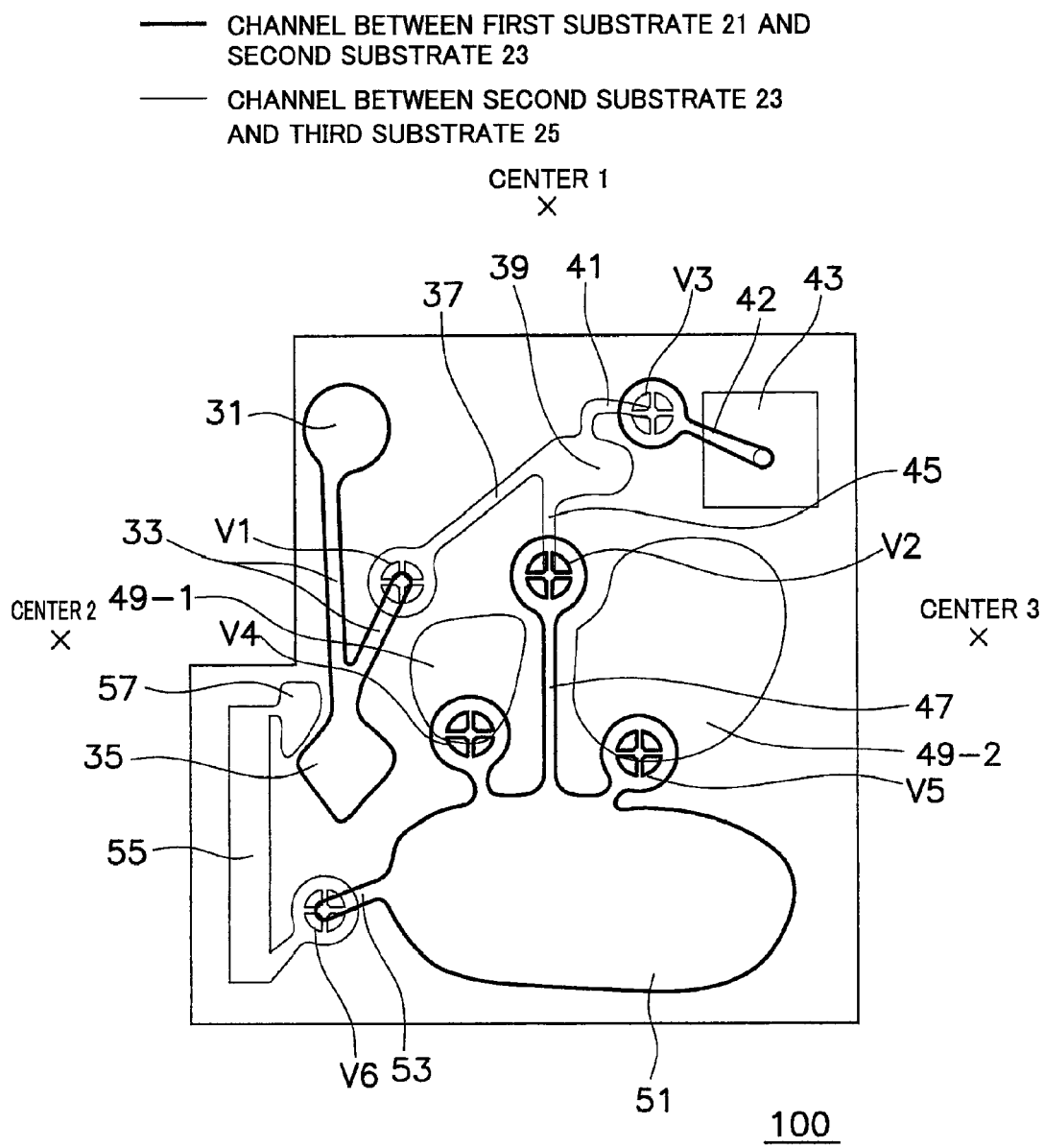

FIG.13A
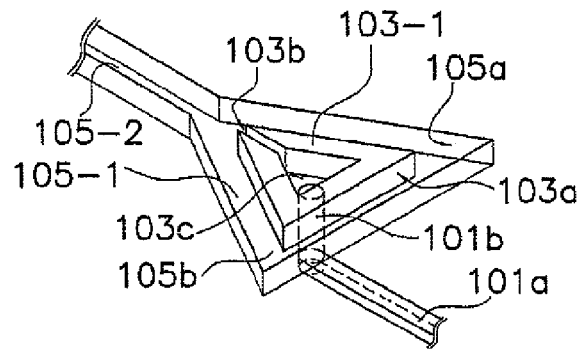
FIG.13B
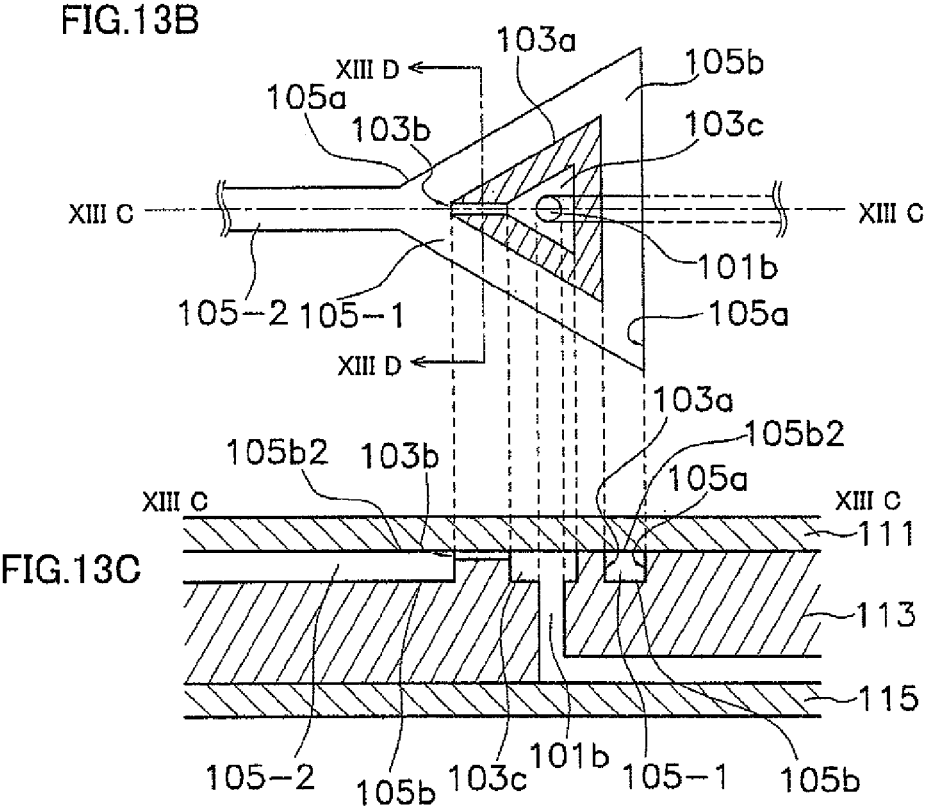
FIG.13C
FIG.13D
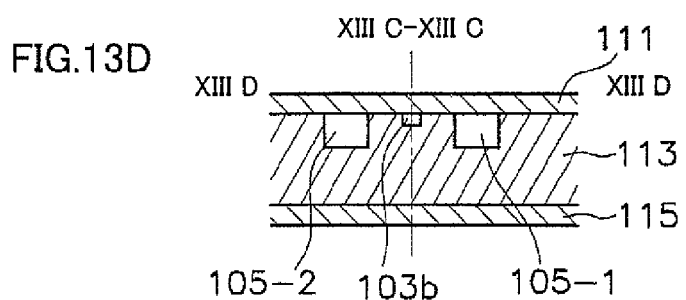

(a)

(b)

(c)

MICROCHIP

BACKGROUND OF THE INVENTION

1. Field of the Invention

The present invention relates to a microchip for treating a sample.

2. Description of the Background Art

A technique referred to as Lab on Chip separating, reacting, mixing, measuring and detecting a biomaterial such as an enzyme, protein, a virus or a cell on a substrate of several mm to several cm in size has recently been watched in the fields of medical care, food, pharmaceuticals and the like. Chips employed in Lab on Chip are generally referred to as microchips, and include a clinical analysis chip, an environmental analysis chip, a gene analysis chip (DNA chip), a protein analysis chip (proteome chip), a sugar chain chip, a chromatograph chip, a cell analysis chip, a pharmaceutical screening chip and the like, for example.

A microchip is provided with treatment portions performing the aforementioned separation, reaction, mixing, measurement and detection, a retention portion retaining a reagent, an untreated sample, a waste liquid resulting from the treatments and the like and channels. The channel connects the treatment portions with each other and with the retention portion, so that a small quantity of liquid can be moved from and to the retention portion and the treatment portions. In order to control such movement of the liquid, a valve is provided in the microchip.

FIG. 16($a$) shows an exemplary valve described in National Patent Publication Gazette No. 2001-503854. The valve shown in FIG. 16($a$) is formed in a microchip, and includes a left reservoir 1$a$, a right reservoir 1$b$ and a tube 2 connecting left and right reservoirs 1$a$ and 1$b$ with each other. The sectional areas of left and right reservoirs 1$a$ and 1$b$ are larger than that of tube 2. If the contact angle $\theta$ of a liquid is at least 90°, pressure on the interface between left reservoir 1$a$ and tube 2 acts in a direction for keeping the liquid in left reservoir 1$a$. If the contact angle $\theta$ is at least 90°, therefore, the liquid in left reservoir 1$a$ is introduced into tube 2 through application of pressure, and further introduced into right reservoir 1$b$ through application of prescribed pressure. If the contact angle $\theta$ of the liquid is less than 90°, on the other hand, the pressure on the interface acts in a direction for drawing the liquid into tube 2 due to capillary attraction, so that the liquid in left reservoir 1$a$ is drawn into tube 2. Then, the liquid is introduced into right reservoir 1$b$ through application of the prescribed pressure. Thus, the reservoirs and a channel having different sectional areas are connected with each other for facilitating the function of the valve.

Japanese Patent Laying-Open No. 2003-270252 discloses a technique of sealing a liquid in a prescribed place by solidifying and charging a soluble valve and passing the liquid by contrarily dissolving the valve by heating or the like.

Further, Japanese Patent Laying-Open No. 11-257231 (1999) discloses a valve mechanically opening/closing a channel. This valve is constituted of an elastic valve diaphragm and a packing, and deformed by a piezoelectric element for opening/closing the channel.

SUMMARY OF THE INVENTION

In the case of the valve described in National Patent Publication Gazette No. 2001-503854, however, it may be difficult to continuously retain the liquid, which must be retained in left reservoir 1$a$. FIGS. 16($b$) and 16($c$) are enlarged diagrams showing the liquid moving along corners between wall surfaces of the valve shown in FIG. 16($a$). As shown in FIGS. 16($b$) and 16($c$), the liquid in left reservoir 1$a$ moves along the corners between the wall surfaces constituting tube 2 through surface tension, to move into right reservoir 1$b$ through tube 2. More specifically, a fluid moving along the corners remains at a point A when reaching point A since the corners run out on this point, while a fluid reaching points B and C from the corners moves into right reservoir 1$b$ since the corners are continuous on points B and C. Particularly when having high wettability with a contact angle $\theta$ of less than 90°, the liquid is drawn into tube 2 due to capillary attraction, and remarkably exhibits behavior of moving into right reservoir 1$b$ through the corners between the wall surfaces due to surface tension. Therefore, it is problematic to use the valve having the structure according to National Patent Publication Gazette No. 2001-503854 as a valve for retaining and passing a liquid.

While the valve described in Japanese Patent Laying-Open No. 2003-270252 can retain a liquid, it is necessary to dissolve the valve in order to take out the liquid. This dissolved valve may be mixed and react with the liquid, an additional reagent etc., to hinder correct determination or detection. Further, a material having solubility and no reactivity with the liquid, the reagent etc. must be selected, and hence the material is limited. In addition, the valve must be charged in a desired place and dissolved, leading to complicatedness in handling of the microchip.

The valve according to Japanese Patent Laying-Open No. 11-257231 must be provided with the valve diaphragm, the packing and the piezoelectric element, and has problems such as difficulty in refinement, complicated manufacturing steps and a high manufacturing cost. Further, the procedure for controlling the operation of the valve for opening/closing the channel is complicated, and an elastic material must be selected for the valve.

Accordingly, an object of the present invention is to provide a microchip capable of controlling retention and passage of a liquid with a simple structure.

In order to solve the aforementioned problems, the present invention provides a microchip including an introduction portion introducing a liquid, an ejection portion ejecting the liquid and a valve connecting the introduction portion and the ejection portion with each other and retaining the liquid so that surface tension of the liquid prevents the liquid from ejection into the ejection portion.

The valve is so formed as to connect the introduction portion and the ejection portion with each other, whereby the liquid introduced from the introduction portion is ejected into the ejection portion necessarily through the valve. When ejected from the introduction portion into the valve, the liquid first comes into contact with the valve surface, to be retained in the introduction portion and/or on the valve surface due to surface tension on the valve surface. Therefore, the liquid such as a reagent introduced into the introduction portion of the aforementioned microchip is not ejected into the ejection portion during transportation or storage before use of the microchip. Further, passage and retention of the liquid can be easily controlled with the valve for retaining the liquid in the introduction portion when no prescribed treatment is performed, ejecting the liquid into the ejection portion by applying centrifugal force exceeding the surface tension to the liquid when a prescribed treatment is performed and thereafter preventing backflow of the liquid from the ejection portion through the surface tension.

According to the aforementioned valve, the liquid introduced from the introduction portion is prevented from ejection into the ejection portion due to the surface tension on the valve, whereby retention and ejection of the liquid can be easily controlled. Further, the liquid is prevented from ejection through the surface tension, whereby the valve can be formed not in a complicated structure such as an on-off system but in a simple structure. Therefore, the microchip including the valve can be easily manufactured and easily refined. For example, the valve can be formed with the same material as that for a channel or the like simultaneously with formation of the channel or the like on a PET (polyethylene terephthalate) substrate by injection molding. Therefore, the microchip can be manufactured through simple manufacturing steps, and the manufacturing cost can be reduced as a result. Further, retention and ejection of the liquid are not controlled by an operation of opening or closing the valve, whereby the microchip has a long life with no influence by flexural fatigue. In addition, the microchip, requiring no apparatus serving as a power source for opening/closing the valve, can be easily transported and stored. Further, the microchip requires no step of charging a filler of a specific material for preventing ejection of the liquid.

The aforementioned valve preferably has a first channel wall having at least one opening ejecting the liquid into the aforementioned ejection portion, the aforementioned ejection portion preferably has a second channel wall independent of the first channel wall, and a channel between the first channel wall and the second channel wall preferably at least partially forms the aforementioned ejection portion.

For example, the first channel wall of the valve is formed to be enclosed with the second channel wall of the ejection portion while separating from the second channel wall by a prescribed distance. Even if the liquid in the introduction portion flows out from the valve, the liquid comes into contact with the first channel wall forming the valve to be retained in the introduction portion and on the surface of the first channel wall of the valve due to the surface tension thereof, not to reach the second channel wall of the ejection portion. The channel between the first and second channel walls and the first channel wall form a corner. A liquid having high wettability with a contact angle θ of less than 90° flows out from the introduction portion through the opening of the first channel wall, to spread over the whole corner of the first channel wall through this corner due to the surface tension. However, the first and second channel walls are formed independently of each other, whereby the liquid simply remains in this corner and cannot reach the second channel wall. Thus, the liquid is not ejected into the ejection portion during transportation or storage before use of the chip, despite the high wettability with the contact angle θ of less than 90°.

In order to eject the liquid retained in the introduction portion and on the valve surface into the ejection portion, centrifugal force is applied to the microchip, for example. When centrifugal force exceeding the surface tension is applied, the liquid retained in the introduction portion and on the surface of the first channel wall of the valve is ejected into the channel of the ejection portion between the first and second channel walls through the opening of the first channel wall of the valve. Further, the liquid reaching the second channel wall of the ejection portion can be further easily ejected through the second channel wall.

The aforementioned opening is preferably so sized as not to eject the liquid into the ejection portion through surface tension.

The liquid can be retained in the introduction portion and on the valve surface by sizing the opening in this manner.

The width of the aforementioned opening is preferably smaller than the channel width of the channel between the aforementioned first channel wall and the aforementioned second channel wall.

The with of the opening of the first channel wall is so set smaller than the channel width of the channel between the first and second channel walls that the liquid is retained in the opening of the first channel wall through the surface tension.

In the microchip according to the present invention, the channel between the aforementioned first channel wall and the aforementioned second channel wall may be provided with a partition on a position opposite to at least one aforementioned opening.

The partition is provided on the position opposite to the opening for receiving the liquid flowing out through the opening of the valve and preventing the same from ejection into the ejection portion through the opening.

In the present invention, the aforementioned valve may be composed of a plurality of structures, and the liquid is retained on the surfaces of the structures and/or between the structures in this case.

The first channel wall is formed by a structure in the form of a sector, a column or a triangular prism, for example. The valve is constituted of the plurality of structures thereby increasing surfaces areas and further increasing the surface tension, so that the liquid cannot be ejected into the ejection portion.

In the present invention, the first channel wall of the aforementioned valve may be formed by an annular channel wall, and the liquid is retained in a space enclosed with the aforementioned first channel wall in this case.

The valve, retaining the liquid in the space enclosed with the annular channel wall, has not only a function of preventing the reagent or a sample from ejection into the ejection portion but also a function serving as a retention portion for the reagent or the sample.

In the present invention, the contact angle θ of the liquid may be less than 90°.

Also when the contact angle θ of the liquid introduced into the introduction portion is less than 90°, the liquid is retained in the introduction portion and on the valve surface by the valve, and not ejected into the ejection portion.

The present invention also provides a method of using the microchip according to the present invention, applying centrifugal force larger than the surface tension of the liquid by rotating the microchip about an axis of rotation for ejecting the liquid from the aforementioned introduction portion into the aforementioned ejection portion.

When no centrifugal force is applied to the microchip, the liquid is not ejected into the ejection portion due to the surface tension on the valve. When centrifugal force larger than the surface tension is applied to the liquid, on the other hand, the liquid having been retained by the valve can be ejected into the ejection portion. When the reagent, the sample and the like are mixed with each other or measured with centrifugal force, the liquid can be ejected into the ejection portion in the course of serial treatments employing this centrifugal force.

According to the present invention, a microchip capable of controlling retention and passage of a liquid with a simple structure can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing an exemplary structure of the overall microchip to which the inventive valve is applied;

FIG. 10A is a perspective view showing another exemplary structure of the valve in microchip 200 according to the present invention;

FIG. 10B is a plan view showing the structure of the valve shown in FIG. 10A;

FIG. 10C is a sectional view taken along the line XC-XC in FIG. 10B;

FIG. 13A is a perspective view showing the structure of a valve in a microchip 300 according to the present invention;

FIG. 13B is a plan view showing the structure of the valve shown in FIG. 13A;

FIG. 13C is a sectional view taken along the line XIIIC-XIIIC in FIG. 13B;

FIG. 13D is a sectional view taken along the line XIIID-XIIID in FIG. 13B;

DESCRIPTION OF THE PREFERRED EMBODIMENTS

<Outline of the Invention>

A microchip according to the present invention includes an introduction portion introducing a liquid, an ejection portion ejecting the liquid and a valve connecting the introduction portion and the ejection portion with each other. The valve couples an outlet of the introduction portion and an inlet of the ejection portion with each other, and so retains the liquid introduced into the introduction portion as not to eject the liquid into the ejection portion through surface tension thereof. When flowing out from the introduction portion into the valve, the liquid first comes into contact with the valve surface, to be retained in the introduction portion and/or on the valve surface due to the surface tension on the valve surface. Therefore, the liquid such as a reagent introduced into the introduction portion of the microchip is not ejected into the ejection portion during transportation or storage before use of the microchip.

First Embodiment (1) Structure Around Valve

Figure 1A:
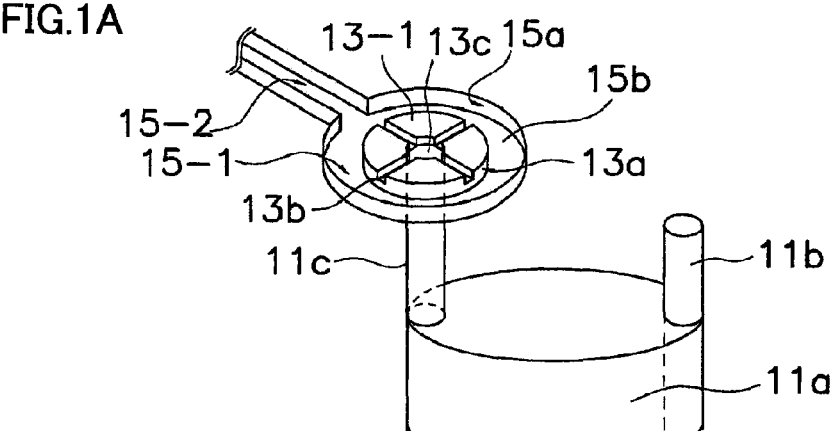
FIG. 1A is a perspective view showing an exemplary structure of a valve in a microchip 100 according to the present invention.
Figure 1B:
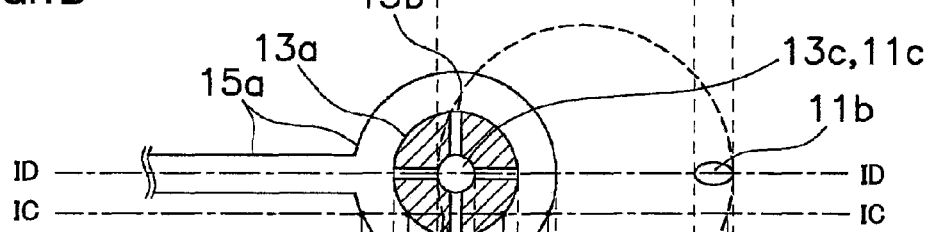
FIG. 1B is a plan view showing the structure of the valve shown in FIG. 1A.
Figure 1C:
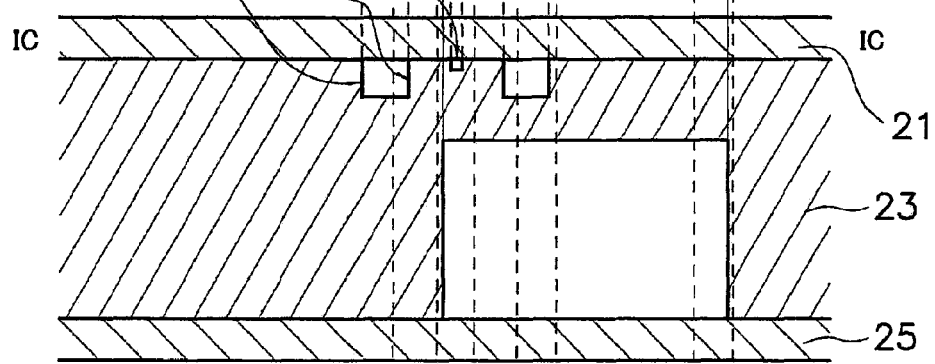
FIG. 1C is a sectional view taken along the line IC-IC in FIG. 1B.
Figure 1D:
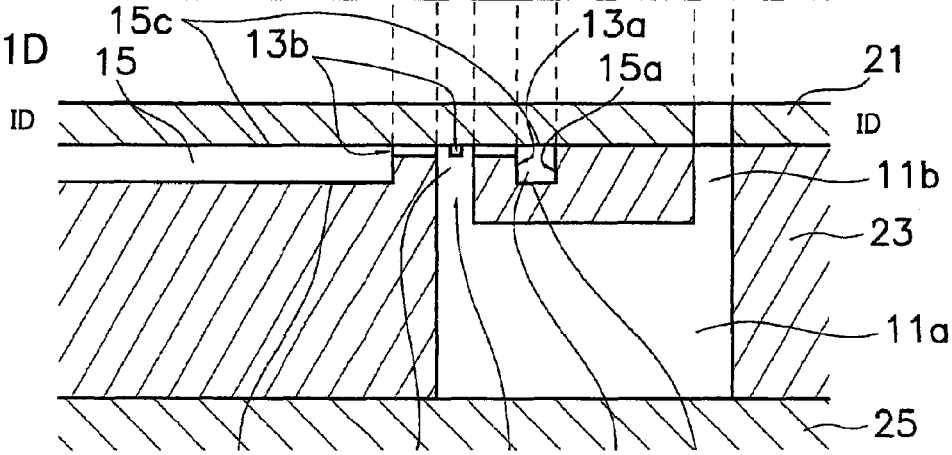
FIG. 1D is a sectional view taken along the line ID-ID in FIG. 1B.

FIGS. 1A to 1D are explanatory diagrams around a valve in a microchip 100 according to the present invention, and FIG. 1A is a perspective view showing an exemplary structure of the valve in microchip 100 according to the present invention, FIG. 1B is a plan view showing the structure of the valve shown in FIG. 1A, FIG. 1C is a sectional view taken along the line IC-IC in FIG. 1B, and FIG. 1D is a sectional view taken along the line ID-ID in FIG. 1B.

Microchip 100 according to the present invention shown in FIGS. 1A to 1D is formed by three substrates, i.e., a first substrate 21, a second substrate 23 and a third substrate 25, and includes an introduction portion 11 receiving a liquid such as a sample or a reagent, an ejection portion 15 into which the liquid is ejected and a valve 13 connecting introduction portion 11 and ejection portion 15 with each other.

Introduction portion 11 has an introduction body 11a retaining the liquid, an introduction inlet 11b and an introduction outlet 11c. Introduction inlet 11b is so formed as to pass through first substrate 21, so that the sample or the reagent can be introduced from outside microchip 100. A vessel formed on the lower surface of second substrate 23 and the upper surface of third substrate 25 defines the sidewall surface, the bottom surface and the upper surface of introduction body 11a. Introduction outlet 11c is so formed as to pass through second substrate 23, and connected to a valve inlet 13c described later.

Valve 13 includes four valve structures 13-1 constituting the valve, valve inlet 13c formed continuously with introduction outlet 11c and valve openings 13b for ejecting the liquid from valve inlet 13c into ejection portion 15. Valve openings 13b are formed between valve structures 13-1 by grooves connecting ejection portion 15 and valve inlet 13c with each other. The valve is formed by the plurality of valve structures thereby increasing surfaces areas and further increasing the surface tension, so that the liquid cannot be ejected into ejection portion 15. The upper surfaces of valve structures 13-1 are in contact with first substrate 21, and valve openings 13b are constituted of the lower surface of first substrate 21 and the grooves formed on the upper surface of second substrate 23. Therefore, the liquid in introduction portion 11 is ejected into a first ejection channel 15-1 described later only through valve inlet 13c and valve openings 13b. The number of valve openings 13b is not restricted to four.

Ejection portion 15 includes first ejection channel 15-1 enclosing valve 13 and a second ejection channel 15-2 downstream first ejection channel 15-1. First and second ejection channels 15-1 and 15-2 are formed by a groove formed on the upper surface of second substrate 23 and the lower surface of first substrate 21. First ejection channel 15-1 is a channel enclosed with valve sidewall surfaces 13a (also referred to as first channel walls) forming the outer wall surfaces of valve structures 13-1, an ejection portion sidewall surface 15a (also referred to as a second channel wall), an ejection portion bottom surface 15b and an ejection portion upper surface 15c. Valve sidewall surfaces 13a and ejection portion sidewall surface 15a may separate from each other at a distance not allowing the liquid to move from valve sidewall surfaces 13a to ejection portion sidewall surface 15a through surface tension and capillary attraction, and this distance may be constant or discontinuous. Second ejection channel 15-2 is a channel enclosed with ejection portion sidewall surfaces 15a opposed to each other, ejection portion bottom surface 15b and ejection portion upper surface 15c.

(2) Operation of Valve

The liquid such as a reagent may be previously introduced into microchip 100 before use of microchip 100. The liquid introduced into introduction portion 11 is preferably retained in introduction body 11a during transportation or storage of microchip 100. However, the liquid such as a reagent may flow out from introduction body 11a toward valve 13, depending on the method of transportation or storage. As hereinabove described, valve 13 is so formed between introduction portion 11 and ejection portion 15 as to connect these portions with each other, whereby the liquid is ejected from introduction portion 11 into ejection portion 15 necessarily through valve 13. It is assumed that the liquid in introduction body 11a reaches valve 13 through introduction outlet 11c. In this case, the liquid comes into contact with the surface of valve 13, to be retained in introduction portion 11 and/or on the surface of valve 13 due to the surface tension on the valve surface.

More specifically, the liquid in introduction portion 11 first reaches valve openings 13b through valve inlet 13c. If having low wettability with a contact angle θ of at least 90°, the liquid is retained in introduction portion 11 due to force acting thereon in a direction for moving from valve openings 13b toward introduction outlet 11c through capillary action (it is assumed that the width of valve openings 13b is less than the channel width of introduction outlet 11c). If having high wettability with a contact angle θ of less than 90°, on the other hand, the liquid is drawn into introduction portion outlet 11c through capillary action since introduction outlet 11c has a smaller channel width than introduction body 11a. Therefore, the liquid having high wettability reaches introduction outlet 11c, valve inlet 13c and valve openings 13b. If the channel section of valve openings 13b is rectangular, valve sidewall surfaces 13a (first channel walls) and ejection portion upper surface 15c form corners. The liquid having high wettability is going to spread on the overall corners through these corners due to the surface tension. However, valve sidewall surfaces 13a (first channel walls) and ejection portion sidewall surface 15a (second channel wall) are separately formed independently of each other through ejection portion bottom surface 15b and ejection portion upper surface 15c as hereinabove described, whereby the liquid remains in these corners, and cannot reach ejection portion sidewall surface 15a. Therefore, the liquid introduced from introduction portion 11 into valve 13 is retained in introduction portion 11, valve inlet 13c, valve openings 13b and/or the corners of valve sidewall surfaces 13a.

(3) Design of Valve (3-1) Dimensions Allowing Valve to Retain Liquid

Figure 2A:
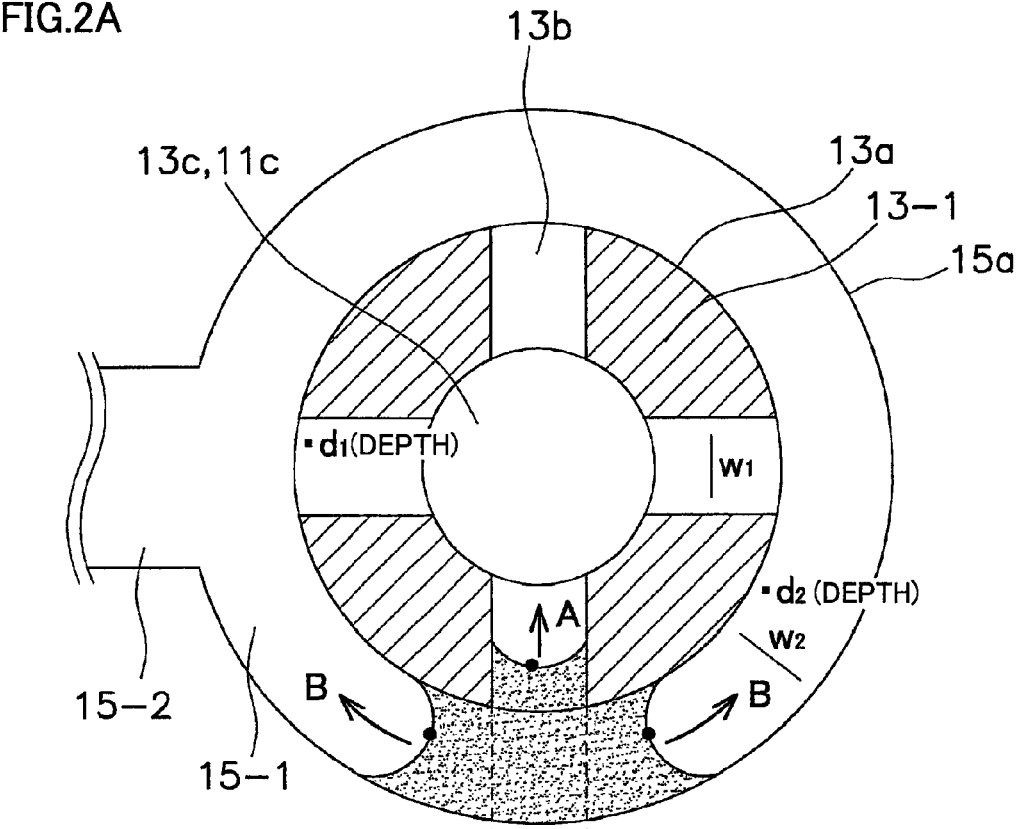
FIGS. 2A and 2B are explanatory diagrams for illustrating the relation between surface tension of a liquid having a contact angle θ of less than 90° and the dimensions of the valve.
Figure 2B:
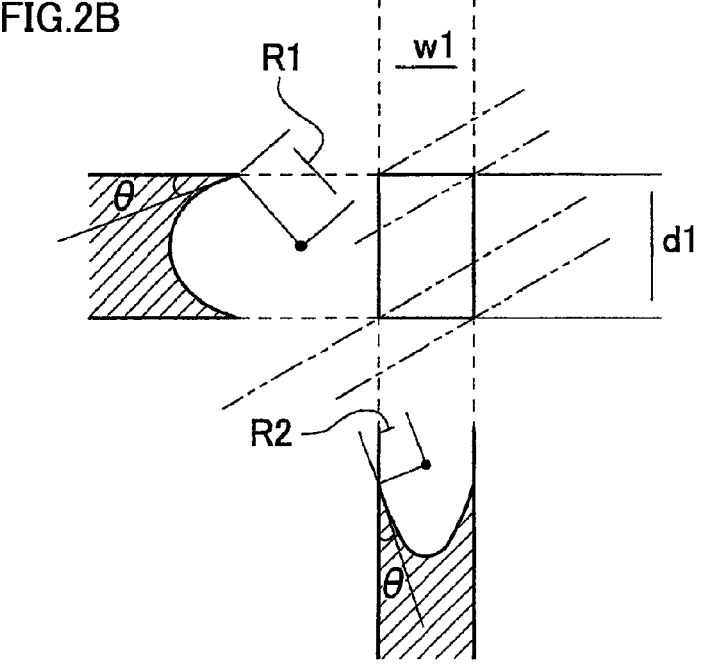

The sizes, i.e., the width, the depth etc. of valve openings 13b are set to magnitudes not allowing the liquid to flow out through surface tension. Design of a valve capable of retaining a liquid having a contact angle θ of less than 90° through surface tension is now described. FIGS. 2A and 2B are explanatory diagrams for illustrating the relation between the surface tension of the liquid having a contact angle θ of less than 90° and the dimensions of the valve.

It is assumed that the liquid is introduced into valve openings 13b through introduction outlet 11c and valve inlet 13c and further reaches ejection portion sidewall surface 15a, as shown in FIG. 2A. In this case, Laplace pressure acting on the point A through surface tension is calculated as follows:

$$P_A = \gamma \times C_A \qquad (1)$$

In this expression, γ represents the surface tension of the liquid. $C_A$ represents surface curvature on point A, which is expressed as follows:

$$C_A = \frac{1}{R1} + \frac{1}{R2} \qquad (2)$$

R1 and R2 represent radii of curvature corresponding to the depth d1 and the width w1 of the channel section of valve openings 13b on point A, and these radii of curvature are expressed as follows:

$$R1 = \frac{d1}{2\cos\theta} \qquad (3)$$

$$R2 = \frac{w1}{2\cos\theta} \qquad (4)$$

On the basis of the expressions (1) to (4), therefore, the Laplace pressure on point A is expressed as follows:

$$P_A = \gamma \times \left( \frac{2\cos\theta}{d1} + \frac{2\cos\theta}{w1} \right) \qquad (5)$$

Assuming that d2 and w2 represent the depth and the width of the channel section of first ejection channel 15-1 on a point B respectively, Laplace pressure on point B is expressed as follows:

$$P_B = \gamma \times \left( \frac{2\cos\theta}{d2} + \frac{2\cos\theta}{w2} \right) \qquad (6)$$

In order to retain the liquid in valve 13 without passing the same to ejection portion sidewall surface 15a, the condition of the following expression (7) must be satisfied:

$$P_A > P_B \qquad (7)$$

In other words, the condition of the following expression (8) must be satisfied, and the relational expression (9) results from the expression (8):

$$\gamma \times \left( \frac{2\cos\theta}{d1} + \frac{2\cos\theta}{w1} \right) > \gamma \times \left( \frac{2\cos\theta}{d2} + \frac{2\cos\theta}{w2} \right) \quad (8)$$

$$\frac{1}{d1} + \frac{1}{w1} > \frac{1}{d2} + \frac{1}{w2} \quad (9)$$

Valve 13 is so designed as to satisfy the above expression (9), whereby the liquid having the contact angle θ of less than 90° is not ejected into first ejection channel 15-1 but retained in valve 13. If the depth d1 of valve openings 13b and the depth d2 of first ejection channel 15-1 are identical to each other, the width w1 of valve openings 13b may be rendered smaller than the width w2 of first ejection channel 15-1.

(3-2) Experimental Example

Figure 3A:
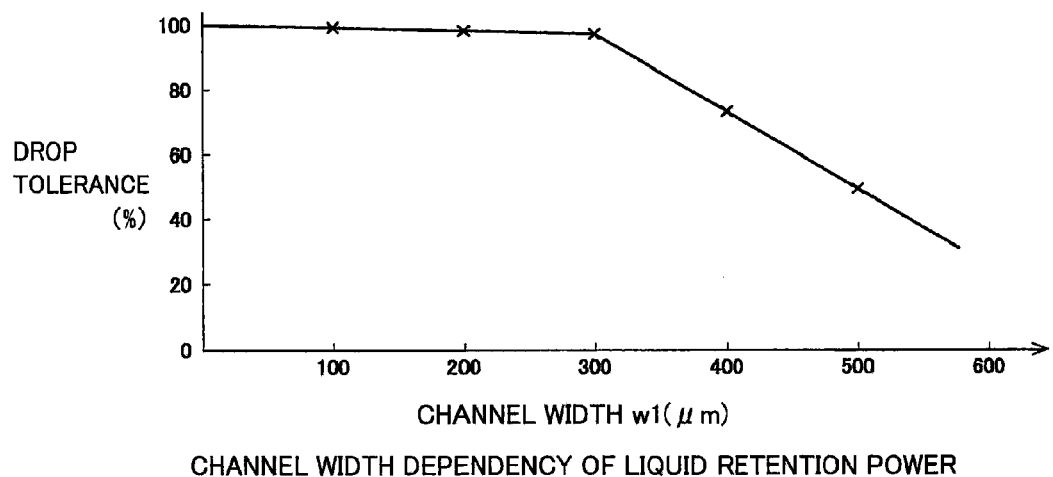
FIG. 3A is a relational diagram showing results of a drop test, i.e., the relation between the widths w1 (μm) of valve openings 13b and drop tolerance (%)

Valves satisfying the above relational expression (9) were prepared with various widths w1 of valve openings 13b. A total cholesterol test reagent (T-ChoA liquid) having a contact angle θ of 15° was introduced into prepared valves 13, and a drop test from a height of 2 m was conducted 20 times for each width w1 at the room temperature. FIG. 3A is a relational diagram showing results of the drop test, i.e., the relation between the widths w1 (μm) of valve openings 13b and drop tolerance (%). The drop tolerance shows the rate (%) at which the liquid does not flow out from the valve in the test conducted 20 times. According to the graph shown in FIG. 3A, the drop tolerance is 50% when the width w1 of valve openings 13b is 500 μm, 80% when the width w1 of valve openings 13b is 400 μm, and 100% when the width w1 of valve openings 13b is 300 μm or less. Reliability of the valve is reduced if the drop tolerance is not more than 50%, and hence the width w1 of valve openings 13b is preferably not more than 500 μm. The width w1 of valve openings 13b is more preferably not more than 400 μm, so that the drop tolerance can be further increased. The width w1 of valve openings 13b is further preferably not more than 300 μm, so that outflow of the liquid can be suppressed even if the microchip is dropped from the height of 2 m.

Figure 3B:
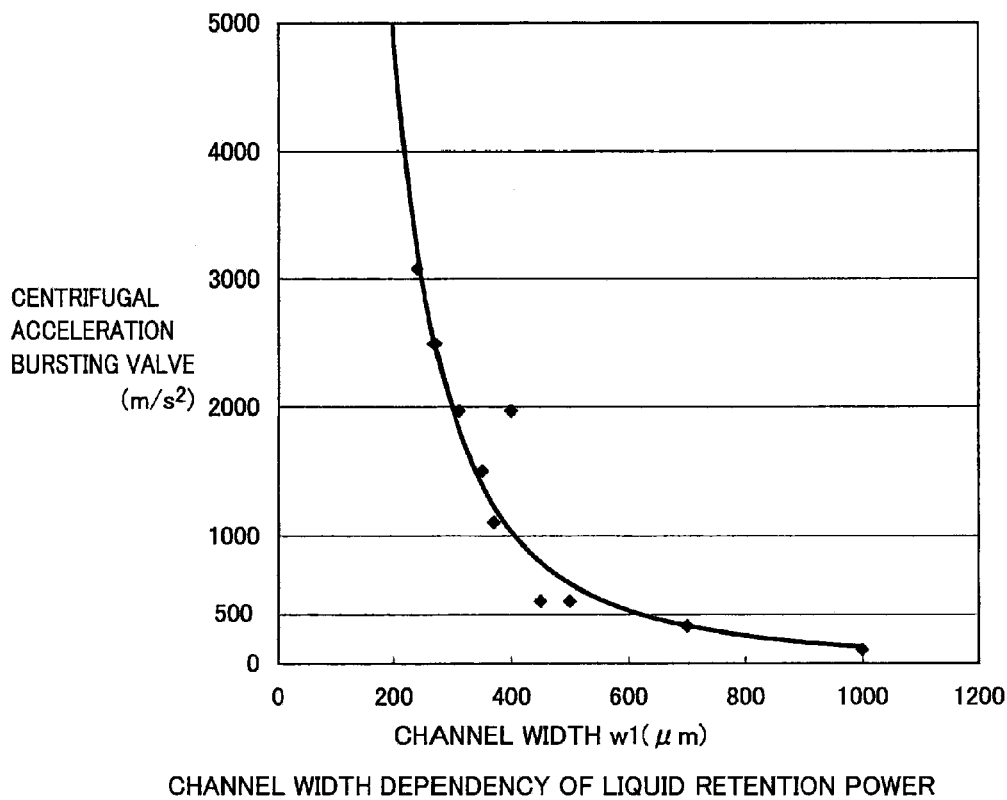
FIG. 3B is a relational diagram showing results of a centrifugal force application test, i.e., the relation between the widths w1 (μm) of valve openings 13b and centrifugal acceleration (m/s²) bursting valves.

Then, microchips similar to those employed in the aforementioned drop test were prepared for conducting a centrifugal force application test of applying centrifugal force to the microchips. FIG. 3B is a relational diagram showing results of the centrifugal force application test, i.e., the relation between the widths w1 (μm) of valve openings 13b and centrifugal acceleration (m/s$^2$) bursting the valve. The centrifugal acceleration bursting the valve is centrifugal acceleration through which the valve can no longer retain a liquid. According to the graph of FIG. 3B, valve 13 can be burst by applying centrifugal acceleration of at least 2000 m/s$^2$ if the width w1 of valve openings 13b is 300 μm. Therefore, a microchip having valve openings 13b with the width w1 of 300 μm can retain the liquid with valve 13 even if dropped from the height of 2 m, and valve 13 can be burst for moving the liquid through application of centrifugal acceleration of at least 2000 m/s$^2$.

In the above, the drop test and the centrifugal force application test were conducted for calculating the threshold value of the width w1 of valve openings 13b with reference to the height of 2 m in consideration of the height of a human being. Alternatively, a height responsive to the service condition of the microchip may be employed for calculating the threshold value of the width w1 of valve openings 13b in response to this height.

(4) Modification

Figure 4A:
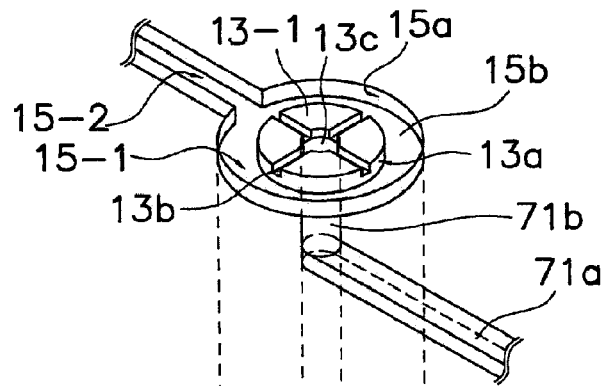
FIG. 4A is a perspective view showing another exemplary structure of the valve in microchip 100 according to the present invention.
Figure 4B:
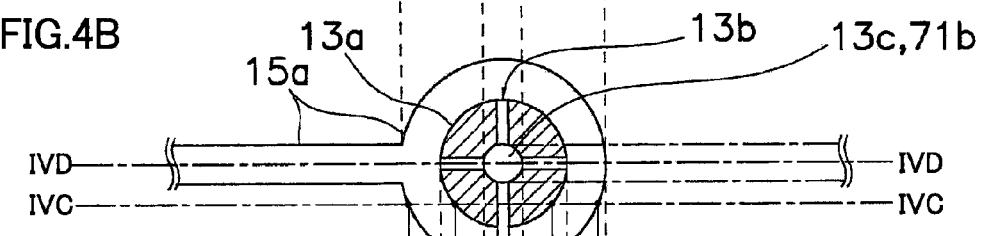
FIG. 4B is a plan view showing the structure of the valve shown in FIG. 4A.
Figure 4C:
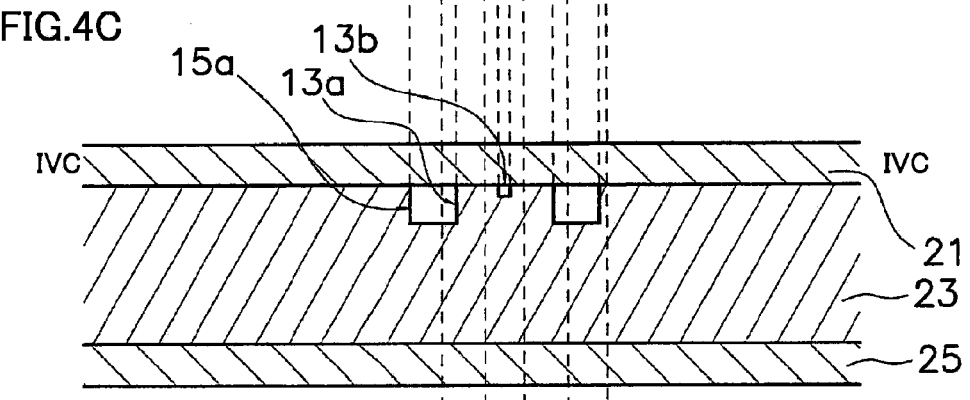
FIG. 4C is a sectional view taken along the line IVC-IVC in FIG. 4B.
Figure 4D:
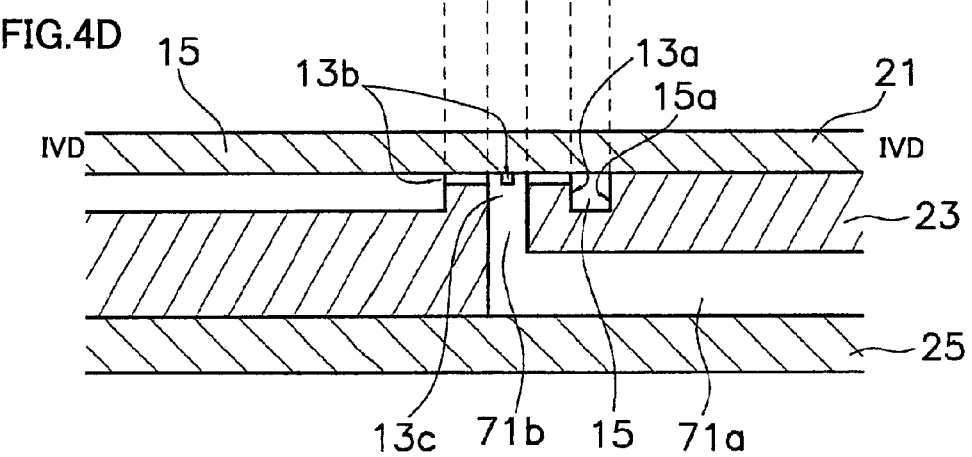
FIG. 4D is a sectional view taken along the line IVD-IVD in FIG. 4B.

FIGS. 4A to 4D show a modification of microchip 100 according to the first embodiment, and FIG. 4A is a perspective view showing another exemplary structure of the valve in microchip 100 according to the present invention, FIG. 4B is a plan view showing the structure of the valve shown in FIG. 4A, FIG. 4C is a sectional view taken along the line IVC-IVC in FIG. 4B, and FIG. 4D is a sectional view taken along the line IVD-IVD in FIG. 4B.

This modification is different from the aforementioned valve 13 shown in FIGS. 1A to 1D in a point that a valve 13 is provided between channels in FIGS. 4A to 4D, while valve 13 is connected between introduction portion 11 formed by a vessel and ejection portion 15 which is a channel in the aforementioned FIGS. 1A to 1D. A channel 71 includes a channel body 71a and a channel outlet 71b. A valve inlet 13c of valve 13 is connected with channel outlet 71b. The remaining structure is similar to the above, and hence redundant description is not repeated. Thus, valve 13 may be provided on an outlet or an inlet of a vessel, or may be provided between channels.

While the upper surfaces of the aforementioned valve structures 13-1 shown in FIGS. 1A to 1D are in contact with first substrate 21, clearances may be provided between the upper surfaces of valve structures 13-1 and the lower surface of first substrate 21 if retention and passage of the liquid can be controlled with valve 13.

(5) Overall Microchip (5-1) Structure of Microchip

FIG. 5 is a block diagram showing an exemplary structure of the overall microchip to which the aforementioned valve 13 is applied. Microchip 100 is bottomed by third substrate 25, while the vessel, the channels and the valve are formed on second substrate 23, and through-holes perforating through the microchip are properly formed on first substrate 21 forming the upper portion. The exemplary structure of microchip 100 is now described with reference to FIG. 5, on the assumption that blood is introduced as the test object.

A blood introduction portion 31, a centrifuge tube 33, a blood cell separation portion 35, valves V2 and V3, a channel 42 connecting valve V3 and a waste liquid reservoir 43 with each other, another channel 47 connecting valve V2 and a mixing portion 51 with each other, valves V4 and V5, mixing portion 51 and still another channel 53 connecting mixing portion 51 and valve V6 with each other are formed between first and second substrates 21 and 23 of microchip 100 shown in FIG. 5. These channels, vessel, valves etc. are formed by the lower surface of first substrate 21 and grooves formed on the upper surface of second substrate 23, similarly to first ejection channel 15-1 shown in FIGS. 1A to 1D etc.

On the other hand, a valve V1, a channel 37 connecting valve V1 and a measurement portion 39 with each other, measurement portion 39, another channel 41 connecting measurement portion 39 and another valve V3 with each other, waste liquid reservoir 43, still another channel 45 connecting measurement portion 39 and valve V2 with each other, reagent reservoirs 49-1 and 49-2, valve V6, a detection path 55 and a buffer 57 are formed between second and third substrates 23 and 25. These channels, vessel, valves etc. are constituted of grooves etc. formed on the lower surface of second substrate 23 and the upper surface of third substrate 25, similarly to introduction body 11 a shown in FIGS. 1A to 1D etc.

Microchip 100 performs various treatments with centrifugal force, for example. Therefore, microchip 100 is rotated about a center 1, 2 or 3 shown in FIG. 5 in response to the corresponding treatment. The structures of the respective portions of microchip 100 are now described in detail.

Blood introduction portion 31 incorporates blood from outside microchip 100.

Centrifuge tube 33, substantially U-shaped, has a first opening end connected to valve V1 and a second opening end connected to blood introduction portion 31. Further, centrifuge tube 33 incorporates the blood from blood introduction portion 31 through rotation about center 1, and centrifuges plasma containing an object component from the blood. The wording "rotation about center 1" indicates an operation of rotating microchip 100 about center 1 and applying centrifugal force of a prescribed direction to the liquid in microchip 100. This also applies to centers 2 and 3.

Blood cell separation portion 35 is provided on the U-shaped bottom of centrifuge tube 33, for separating blood cells corresponding to a component other than the object component (hereinafter referred to as a non-object component) from the blood and retaining the same. Blood cell separation portion 35 is so provided that plasma containing the object component and the blood cells corresponding to the non-object component can be efficiently separated from each other.

Measurement portion 39 is connected with channel 37 following centrifuge tube 33, channel 41 following waste liquid reservoir 43 and channel 45 following mixing portion 51, and has a prescribed volume. Channel 41 following waste liquid reservoir 43 is connected to a prescribed position of measurement portion 39, so that a prescribed quantity of plasma can be measured with measurement portion 39. The plasma is introduced from centrifuge tube 33 into measurement portion 39 through rotation about center 2. Excess plasma overflowing measurement portion 39 is introduced into waste liquid reservoir 43 through channel 41 and valve V3. Thus, the prescribed quantity of plasma can be correctly measured.

Waste liquid reservoir 43 is connected to measurement portion 39 through valve V3, for retaining the excess plasma as described above.

Reagent reservoirs 49-1 and 49-2 are connected to mixing portion 51 through valves V4 and V5 respectively, and previously supplied with reagents before use of microchip 100. The reagents in reagent reservoirs 49-1 and 49-2 are introduced into mixing portion 51 through rotation about center 1 in centrifugation.

Mixing portion 51 is connected to reagent reservoirs 49-1 and 49-2 through valves V4 and V5, connected to measurement portion 39 through channel 47 and valve V2, and connected to detection path 55 through channel 53 and valve V6. Mixing portion 51 is supplied with the reagents through the rotation about center 1 in centrifugation. After measured in measuring portion 39 through the rotation about center 2, the prescribed quantity of plasma is introduced into mixing portion 51 through valve V2 and channel 47 through rotation about center 1. Then, mixing portion 51 mixes the reagents and the plasma containing the object component with each other through rotation about centers 1 and 2.

Detection path 55 is connected to mixing portion 51 through valve V6, and supplied with a mixed sample of the reagents and the plasma. In order to optically perform detection, for example, light is introduced into detection path 55 from an end of detection path 55, and the light passing through detection path 55 is taken out from another end. Then, the object component is determined by measuring light transmittance.

Each of valves V1 to V6 is similar in structure to the aforementioned valve 13, and hence redundant description is not repeated. Valve V1 is positioned under centrifuge tube 33. In valve V1, an end of upper centrifuge tube 33 and valve inlet 13c are connected with each other through a channel (not shown) passing through second substrate 23. Valve V2 is positioned above measurement portion 39, and an end of channel 45 and valve inlet 13c are connected with each other through a channel (not shown) passing through second substrate 23. Valve V3 is positioned above measurement portion 39, and an end of channel 41 and valve inlet 13c are connected with each other through a channel (not shown) passing through second substrate 23. Valves V4 and V5 are positioned above reagent reservoirs 49-1 and 49-2, and a channel (not shown) passing through second substrate 23 up to valve inlet 13c is formed on reagent reservoirs 49-1 and 49-2. Valve V6 is positioned under mixing portion 51, and an end of channel 53 and valve inlet 13c are connected with each other through a channel (not shown) passing through second substrate 23. These valves V1 to V6 prevent unintended movement such as movement of the liquid in a case where no centrifugal force is applied to microchip 100 or movement of the liquid in a direction irrelevant to the centrifugal direction.

(5-2) Operation of Microchip

Figure 6:
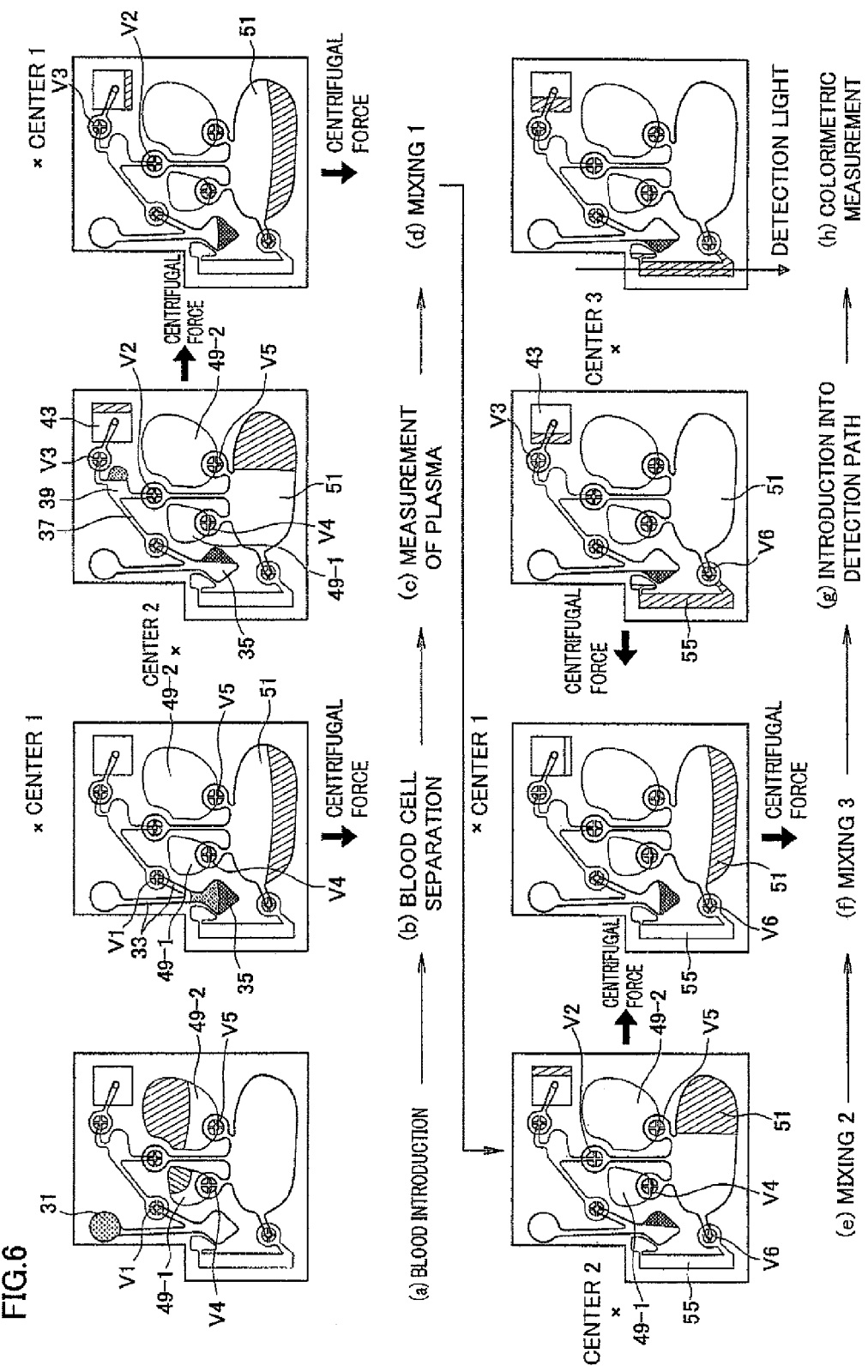
FIG. 6 is an exemplary flow chart showing a method of using the microchip and the procedures of various treatments in the microchip.

A method of using the microchip and the procedures of various treatments in the microchip are now described. FIG. 6 is an exemplary flow chart showing the method of using the microchip and the procedures of various treatments in the microchip.

(a) Blood Introduction

Reagent reservoirs 49-1 and 49-2 of microchip 100 previously retain the reagents. First, the blood is introduced into blood introduction portion 31 (see FIG. 6(a)).

(b) Blood Cell Separation

Then, centrifugal force is applied to the liquid in microchip 100 along arrow (see FIG. 6(b)) through rotation about center 1. Thus, the blood is first introduced from blood introduction portion 31 into centrifuge tube 33. Blood cells in the blood are introduced into the bottom of blood cell separation portion 35 through further rotation about center 1, so that the plasma is separated as a supernatant. In this centrifugation about center 1, the reagents retained in reagent reservoirs 49-1 and 49-2 are introduced into mixing portion 51 through valves V4 and V5.

(c) Measurement of Plasma

Then, centrifugal force is applied along arrow (see FIG. 6(c)) through rotation about center 2, for introducing the plasma in centrifuge tube 33 and blood cell separation portion 35 into measurement portion 39 through valve V1 and channel 37. The blood cells and/or part of the plasma is retained in blood cell separation portion 35, and not introduced into measurement portion 39. Excess part of the plasma introduced into measurement portion 39 is discarded from measurement portion 39 into waste liquid reservoir 43 through channel 41, valve V3 and channel 42. When the plasma is completely measured, the rotation about center 2 is terminated.

(d) Mixing 1

Then, centrifugal force is applied along arrow (see FIG. 6(d)) through rotation about center 1, for introducing the plasma measured in measurement portion 39 into mixing portion 51 and mixing the plasma with the reagents.

(e) Mixing 2

The rotation center is changed for applying centrifugal force along arrow (see FIG. 6(e)) through rotation about center 2 and mixing the plasma and the reagents with each other.

(f) Mixing 3

Further, centrifugal force is applied along arrow (see FIG. 6(f)) through rotation about center 1 again, for further mixing the plasma and the reagents with each other.

(g) Introduction into Detection Path

Then, centrifugal force is applied along arrow (see FIG. 6(g)) through rotation about center 3, for introducing the mixed sample of the plasma and the reagents into detection path 55.

(h) Colorimetric Measurement

Finally, the object component is determined by transmitting light through detection path 55 supplied with the mixed sample and measuring the quantity of the light passing through detection path 55 (see FIG. 6(h)).

(5-3) Functions of Valves

The functions of valves V1 to V6 are now described.

(a) Valve V1

Valve V1 introduces the plasma from blood cell separation portion 35 and centrifuge tube 33 into measurement portion 39 through channel 37 in the treatment of measuring the plasma (see FIG. 6(c)), and prevents unintended movement of the blood cells and the plasma from blood cell separation portion 35 and measurement portion 39 in treatments other than the treatment of measuring the plasma. The mechanism of preventing unintended movement of the blood cells and the plasma with valve V1 is now described.

(i) Prevention of Outflow from Centrifuge Tube 33 to Channel 37

After the treatment of blood cell separation (see FIG. 6(b)) is completed, the blood cells and the plasma are separately present in blood cell separation portion 35 and centrifuge tube 33. Before the subsequent treatment of measuring the plasma (see FIG. 6(c)), the plasma and the blood cells are preferably retained in blood cell separation portion 35 and centrifuge tube 33, in order to correctly measure the plasma with measurement portion 39. If flowing out through centrifuge tube 33, channel 37 etc., for example, the plasma is also introduced into channel 47 linked to valve V2, and the prescribed quantity of plasma cannot be correctly measured. Centrifuge tube 33 linked to valve V1 from blood cell separation portion 35 has a smaller channel width than blood cell separation portion 35. When rotation is terminated and no centrifugal force is applied, therefore, the blood cells and the plasma in blood cell separation portion 35 are going to creep toward valve V1 through capillary action. Then, the blood cells and the plasma creep along the corners of valve sidewall surfaces 13a and ejection portion bottom surface 15b of valve V1 through surface tension, to spread over the corners. However, valve sidewall surfaces 13a of valve V1 are separate from ejection portion sidewall surface 15a, whereby the blood cells and the plasma in blood cell separation portion 35 remain in the corners of valve sidewall surfaces 13a and ejection portion bottom surface 15b due to surface tension, and are not ejected from valve V1 into channel 37. In this case, ejection portion 15 is channel 37, and ejection portion sidewall surface 15a (second channel wall) is a sidewall surface formed continuously with channel 37 to be opposed to valve sidewall surfaces 13a (first channel walls).

After the treatment of measuring the plasma (see FIG. 6(c)) is completed, the blood cells and/or part of the plasma remains in blood cell separation portion 35, and the plasma is present in measurement portion 39. Also when no centrifugal force is applied, the blood cells and/or part of the plasma remaining in blood cell separation portion 35 is going to reach valve V1 through the corners of centrifuge tube 33 due to capillary action and surface tension. However, valve sidewall surfaces 13a are separate from ejection portion sidewall surface 15a, whereby the blood cells and/or part of the plasma in blood cell separation portion 35 is not ejected from valve V1 into channel 37.

When centrifugal force is applied to microchip 100 and the centrifugal direction is different from the direction from blood cell separation portion 35 toward channel 37, the blood cells and/or the plasma in blood cell separation portion 35 can move from blood cell separation portion 35 to valve V1 due to surface tension and capillary attraction. In other words, the blood cells and/or the plasma in blood cell separation portion 35 may move from blood cell separation portion 35 to valve V1 against the centrifugal direction due to the surface tension and the capillary attraction. However, valve sidewall surfaces 13a of valve V1 and ejection portion sidewall surface 15a are separately formed independently of each other as hereinabove described, whereby the plasma is prevented from ejection from blood cell separation portion 35 into measurement portion 39 in treatments other than the treatment of measuring the plasma.

(ii) Prevention of Backflow from Measurement Portion 39 to Channel 37

Channel 37 has a smaller channel width than measurement portion 39, whereby the plasma in measurement portion 39 is going to travel toward valve V1 through channel 37 due to capillary action when rotation is completed and no centrifugal force is applied. Then, the plasma is going to travel through the corners of ejection portion sidewall surface 15a and ejection portion bottom surface 15b due to the surface tension, to spread over the corners. In this case, ejection portion bottom surface 15b is a channel bottom surface formed continuously with channel 37. However, ejection portion sidewall surface 15a is separate from valve sidewall surfaces 13a of valve V1, whereby the plasma remains in the corners of ejection portion sidewall surface 15a and ejection portion bottom surface 15b due to the surface tension, not to flow back from valve V1 toward centrifuge tube 33.

When centrifugal force is applied to microchip 100 and the centrifugal direction is different from the direction from measurement portion 39 toward valve V1, the plasma can move from measurement portion 39 toward valve V1 due to surface tension and capillary attraction. In other words, the plasma in measurement portion 39 may move from measurement portion 39 to valve V1 against the centrifugal direction due to the surface tension and the capillary attraction. However, valve sidewall surfaces 13a of valve V1 and ejection portion sidewall surface 15a are separately formed independently of each other as hereinabove described, whereby backflow of the plasma from measurement portion 39 to valve V1 can be prevented.

(b) Valve V2

Valve V2 introduces the plasma from measurement portion 39 into mixing portion 51 in the treatment of mixing 1 (see FIG. 6(d)), for preventing unintended movement of the plasma and the mixed sample from measurement portion 39 and mixing portion 51 in the treatments other than the mixing 1. The mechanism of preventing unintended movement of the plasma and the mixed sample with valve V2, substantially similar to the case of valve V1, is now briefly described.

(i) Prevention of Outflow from Measurement Portion 39 to Channel 47

After the treatment of measuring the plasma (see FIG. 6(c)) is completed, the plasma is present in measurement portion 39. Channel 45 leading to valve V2 from measurement portion 39 has a smaller channel width than measurement portion 39. Also when rotation is completed and no centrifugal force is applied, therefore, the plasma in measurement portion 39 reaches valve sidewall surfaces 13a of valve V2 due to capillary action and surface tension. However, valve sidewall surfaces 13a of valve V2 are separate from ejection portion sidewall surface 15a, whereby the plasma remains in the corners of valve sidewall surfaces 13a and ejection portion bottom surface 15b due to the surface tension, and is not ejected from valve V2 to channel 47. In this case, ejection portion 15 is channel 47, and ejection portion sidewall surface 15a is a sidewall surface formed continuously with channel 47 to be opposed to valve sidewall surfaces 13a.

Thus, the plasma is kept in measurement portion 39 up to the treatment of mixing 1, so that the time for mixing the plasma and the reagents etc. can be accurately controlled by controlling the timing for introducing the plasma into mixing portion 51. Further, a desired quantity of plasma can be introduced into mixing portion 51.

The plasma in measurement portion 39 may move from measurement portion 39 to valve V2 against the centrifugal direction due to the surface tension and the capillary attraction. However, valve sidewall surfaces 13a of valve V2 and ejection portion sidewall surface 15a are separately formed independently of each other as hereinabove described, whereby ejection of the plasma from measurement portion 39 into mixing portion 51 is prevented in the treatments other than the mixing 1.

(ii) Prevention of Backflow from Mixing Portion 51 to Channel 47

After the treatment of blood cell separation (see FIG. 6(b)) is completed, the reagents have been introduced into mixing portion 51 from reagent reservoirs 49-1 and 49-2. Channel 47 leading to valve V2 from mixing portion 51 has a smaller channel width than mixing portion 51, whereby the reagents in mixing portion 51 are going to travel toward valve V2 through channel 47 due to capillary action also when rotation is completed and no centrifugal force is applied. Then, the reagents are going to travel through the corners of ejection portion sidewall surface 15a and ejection portion bottom surface 15b due to surface tension, to spread over the corners. In this case, ejection portion bottom surface 15b is the channel bottom surface formed continuously with channel 47. However, ejection portion sidewall surface 15a is separate from valve sidewall surfaces 13a of valve V2, whereby the reagents remain in the corners of ejection portion sidewall surface 15a and ejection portion bottom surface 15b due to the surface tension, not to flow back from valve V2 toward channel 45.

After the treatment of mixing 1 (see FIG. 6(d)) is completed, the mixed sample of the reagents and the plasma is present in mixing portion 51. Similarly to the above, ejection portion sidewall surface 15a is separate from valve sidewall surfaces 13a of valve V2, whereby the mixed sample remains in the corners of ejection portion sidewall surface 15a and ejection portion bottom surface 15b due to surface tension, not to flow back from valve V2 toward channel 45.

While the reagents and the mixed sample in mixing portion 51 may move from mixing portion 51 toward valve V2 against the centrifugal direction, valve sidewall surfaces 13a of valve V2 and ejection portion sidewall surface 15a are so separately formed independently of each other that the reagents and the mixed sample do not flow back from valve V2 toward channel 45.

(c) Valve V3

Valve V3 introduces the plasma from measurement portion 39 into waste liquid reservoir 43 in the treatment of measuring the plasma (see FIG. 6(c)), and prevents unintended movement of the plasma from measurement portion 39 and waste liquid reservoir 43 in the treatments other than the treatment of measuring the plasma. The mechanism of preventing unintended movement of the plasma with valve V3, substantially similar to the aforementioned case of valve V1 etc., is now briefly described and redundant description is not repeated.

(i) Prevention of Outflow from Measurement Portion 39 to Channel 42

After the treatment of measuring the plasma (see FIG. 6(c)) is completed, the plasma is present in measurement portion 39. Valve V3 keeps the plasma in measurement portion 39 up to the measurement of the plasma, and prevents outflow of the plasma from measurement portion 39 to waste liquid reservoir 43. Thus, the plasma can be correctly measured in measurement portion 39.

(ii) Prevention of Backflow from Waste Liquid Reservoir 43 to Channel 41

After the treatment of measuring the plasma (see FIG. 6(c)) is completed, plasma overflowing measurement portion 39 has been ejected into waste liquid reservoir 43, while valve V3 keeps the ejected plasma in waste liquid reservoir 43 and prevents backflow of the plasma from waste liquid reservoir 43 to measurement portion 39. The plasma can be correctly measured in measurement portion 39 also by this.

(d) Valves V4 and V5

Valves V4 and V5 introduce the reagents from reagent reservoirs 49-1 and 49-2 into mixing portion 51 in the treatment of separating blood cells (see FIG. 6(b)), and prevent unintended movement of the reagents and the mixed sample from reagent reservoirs 49-1 and 49-2 and mixing portion 51 in the treatments other than the treatment of separating blood cells. The mechanism of preventing unintended movement of the reagents and the mixed sample with valves V4 and V5, substantially similar to the aforementioned case of valve V1 etc., is now briefly described and redundant description is not repeated.

(i) Prevention of Outflow from Reagent Reservoirs 49-1 and 49-2 to Mixing Portion 51

The reagents have been previously introduced into reagent reservoirs 49-1 and 49-2. Valves V4 and V5 keep the reagents in reagent reservoirs 49-1 and 49-2 up to separation of blood cells, and prevent the reagents from flowing out from reagent reservoirs 49-1 and 49-2 to mixing portion 51 before use of the microchip during transportation or the like.

(ii) Prevention of Backflow from Mixing Portion 51 to Reagent Reservoirs 49-1 and 49-2

The reagents are present in mixing portion 51 after the treatment of separating blood cells (see FIG. 6(b)) is completed, and the mixed sample is present in mixing portion 51 after the treatment of mixing 1 (see FIG. 6(d)) is completed. Valves V4 and V5 prevent the reagents and the mixed sample in mixing portion 51 from flowing back from mixing portion 51 to reagent reservoirs 49-1 and 49-2.

(e) Valve V6

Valve V6 introduces the mixed sample from mixing portion 51 into detection path 55 in the treatment of introduction into the detection path (see FIG. 6(g)), and prevents unintended movement of the reagents and the mixed sample from mixing portion 51 and detection path 55 in the treatments other than the introduction into the detection path. The mechanism of preventing unintended movement of the reagents and the mixed sample with valve V6, substantially similar to the aforementioned case of valve V1 etc., is now briefly described and redundant description is not repeated.

(i) Prevention of Outflow from Mixing Portion 51 to Detection Path 55

The reagents are present in mixing portion 51 after the treatment of separating blood cells (see FIG. 6(b)) is completed, and the mixed sample is present in mixing portion 51 after the treatment of mixing 1 (see FIG. 6(d)) is completed.

Valve V6 keeps the reagents and the mixed sample in mixing portion 51 up to the treatment of introduction into the detection path (see FIG. 6(g)), and prevents the plasma and the mixed sample in mixing portion 51 from flowing out from mixing portion 51 to detection path 55. Thus, outflow of only the reagents toward detection path 55 or outflow of the reagents and the plasma not yet completely mixed with each other toward detection path 55 can be prevented. Therefore, the object component can be correctly determined in detection path 55.

(ii) Prevention of Backflow from Detection Path 55 to Mixing Portion 51

Valve V6 prevents the mixed sample in detection path 55 from flowing back to mixing portion 51 after the treatment of introduction into the detection path.

(6) Manufacturing Method

Figure 7:
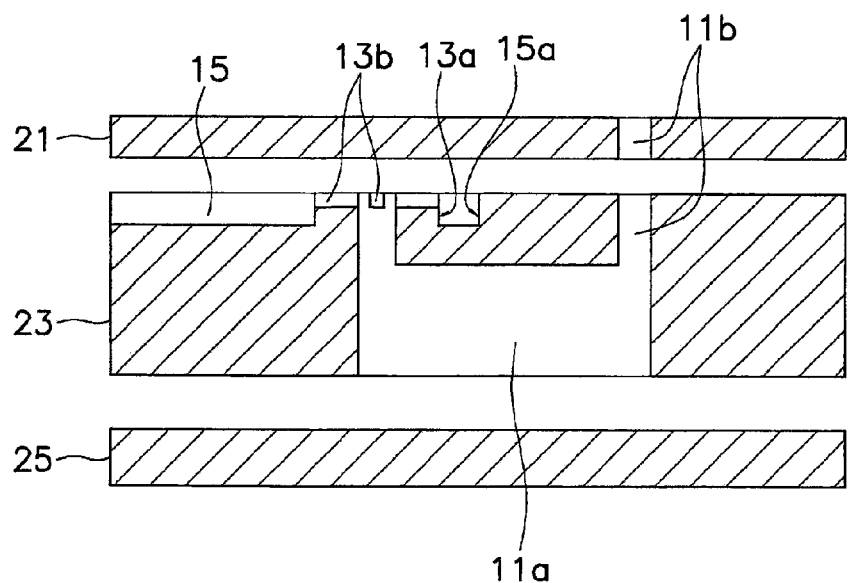
FIG. 7 is an explanatory diagram showing a method of manufacturing microchip 100 having a valve 13.

A method of manufacturing microchip 100 having the aforementioned valve 13 is now described. Microchip 100 can be simply manufactured by employing injection molding well known in this field. FIG. 7 is an explanatory diagram showing the method of manufacturing microchip 100 having valve 13. While FIG. 7 shows only a method of manufacturing a portion around valve 13, the remaining channels, vessel and reservoirs are also similarly formed.

Microchip 100 is bottomed by third substrate 25, introduction body 11a, introduction outlet 11c, valve 13 and ejection portion 15 are formed on second substrate 23 by injection molding, and introduction inlet 11b is formed in first substrate 21 by injection molding for topping microchip 100. These first, second and third substrates 21, 23 and 25 are bonded to each other, thereby completing microchip 100.

Injection molding is performed by preparing metal molds having shapes corresponding to introduction portion 11, valve 13 and ejection portion 15 and pressing the metal molds against second substrate 23 and first substrate 21.

For example, Dianite MA521 by Mitsubishi Rayon Co., Ltd. can be employed for the metal molds, and PET (poly ethylene terephthalate) can be employed for the substrates. PET and Dianite MA521 by Mitsubishi Rayon Co., Ltd. may be dried and dehumidified with a hot air drier at 150° C. for 5 to 10 hours, for example, so that injection molding can be performed under conditions of a molding temperature (cylinder temperature) of 275° C., resin pressure of 15 kg/cm$^2$ etc. Further, thermocompression bonding can be employed for bonding third substrate 25 to first substrate 21 to each other, and the substrates can be bonded to each other by setting the temperature of metal plates for pressurizing the substrates from above and below respectively to 80° C. and pressurizing the substrates at 0.1 MPa for 3 to 5 minutes, for example.

As the material for the substrates, PBT (polybutylene terephthalate), PMMA (polymethyl methacrylate), PC (polycarbonate), PS (polystyrene), PP (polypropylene), PE (polyethylene), PEN (polyethylene naphthalate), PAR (polyallylate resin), ABS (acrylonitrile-butadiene-styrene resin), PVC (polyvinyl chloride), PMP (polymethyl pentene resin), PBD (polybutadiene resin), BP (biolytic polymer), COP (cycloolefin polymer), PDMS (polydimethyl siloxane) or the like may be used in place of PET substrates.

In order to bond the substrates to each other, a tackifier or an adhesive may be employed, or welding by a supersonic method and a laser method may be employed.

Further, molding or imprinting may be utilized in place of injection molding with metal molds.

In addition, a photolithography step, machine work etc. may be directly performed on one or two flat substrates, for obtaining substrates to which patterns corresponding to introduction portion 11, valve 13 and ejection portion 15 are transferred.

(7) Function/Effect

Thus, the liquid such as a reagent introduced into introduction portion 11 in microchip 100 is not ejected into ejection portion 15 before use of the chip during transportation or storage. Further, valve 13 can not only retain the liquid in introduction portion 11 before use but also prevent backflow of the liquid from ejection portion 15 into introduction portion 11. For example, the liquid is retained in introduction portion 11 when no prescribed treatment is performed, while centrifugal force exceeding surface tension is applied to the liquid for ejecting the liquid into ejection portion 15 when a prescribed treatment is performed. Thereafter backflow from ejection portion 15 is prevented through the surface tension on the surface of valve 13. Thus, passage and retention of the liquid can be simply controlled by employing valve 13. Particularly when a liquid having high wettability with a contact angle θ of less than 90° is introduced into microchip 100, passage and retention of the liquid can be simply and accurately controlled by applying the aforementioned valve to microchip 100.

When the liquid is in contact with the wall surfaces of the introduction portion, the ejection portion, the channels etc. in the microchip, the wettability gradually is increased and the contact angle θ thereof is reduced with the elapse of time. Therefore, a hydrophilic valve such as that according to the present invention, applicable to both of a liquid having high wettability and a liquid increased in wettability with the elapse of time, is more preferable than a water-repellent valve preventing movement of a liquid through low wettability.

According to the aforementioned valve 13, surface tension is employed for preventing ejection of the liquid, whereby the valve can be formed not in a complicated structure such as an on-off system but in a simple structure. Therefore, microchip 100 including valve 13 can be easily manufactured, and easily refined. For example, the valve can be formed with the same material as the channels or the like simultaneously with formation of the channels or the like on PET (poly ethylene terephthalate) substrates by injection molding. Therefore, the microchip can be manufactured through simple manufacturing steps, and the manufacturing cost can be reduced as a result. Further, retention and ejection of the liquid are not controlled by an operation of the valve such as opening or closing, whereby the microchip has a long life with no influence by flexural fatigue. In addition, microchip 100 requiring no apparatus serving as a power source for opening/closing the valve can be easily transported and stored. Further, the microchip requires no step of charging a filler of a specific material for preventing ejection of the liquid.

Second Embodiment (1) Structure around Valve

Figure 8A:
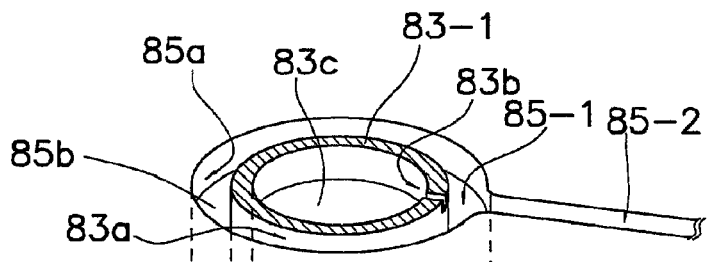
FIG. 8A is a perspective view showing an exemplary structure of a valve in a microchip 200 according to the present invention.
Figure 8B:
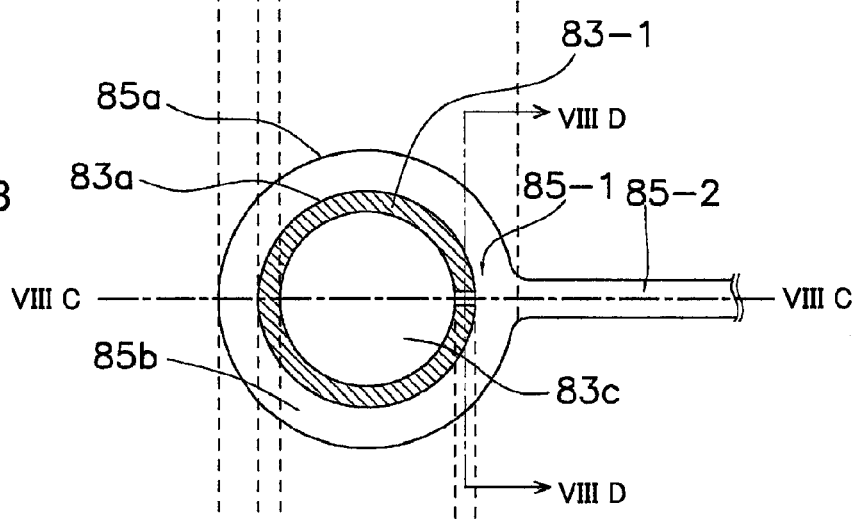
FIG. 8B is a plan view showing the structure of the valve shown in FIG. 8A.
Figure 8C:
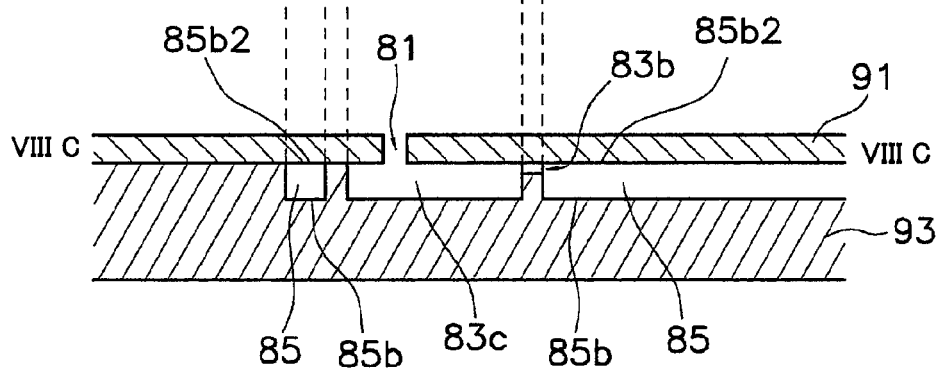
FIG. 8C is a sectional view taken along the line VIIIC-VIIIC in FIG. 8B.
Figure 8D:
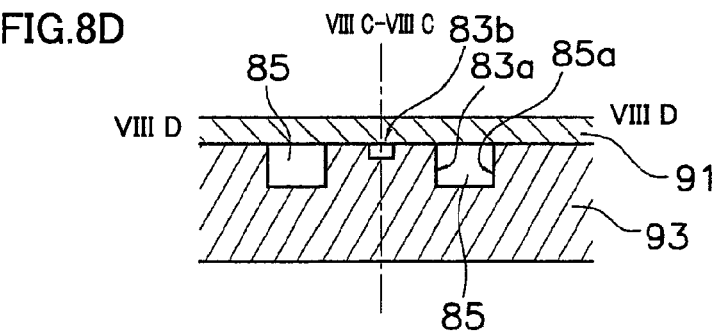
FIG. 8D is a sectional view taken along the line VIIID-VIIID in FIG. 8B.

FIGS. 8A to 8D are explanatory diagrams around a valve in a microchip 200 according to the present invention, and FIG. 8A is a perspective view showing an exemplary structure of the valve in microchip 200 according to the present invention, FIG. 8B is a plan view showing the structure of the valve shown in FIG. 8A, FIG. 8C is a sectional view taken along the line VIIIC-VIIIC in FIG. 8B, and FIG. 8D is a sectional view taken along the line VIIID-VIIID in FIG. 8B.

Microchip 200 according to the present invention shown in FIGS. 8A to 8D is formed by two includes, i.e., first and second substrates 91 and 93, and includes an introduction portion 81 receiving a liquid such as a sample or a reagent, an ejection portion 85 into which the liquid is ejected and a valve 83 connecting introduction portion 81 and ejection portion 85 with each other.

Introduction portion 81 is so formed as to pass through first substrate 91, and connected to a valve inlet 83c described later. The sample, the reagent or the like can be introduced into valve 83 from outside microchip 200 through this introduction portion 81.

Valve 83 is formed by an annular valve structure 83-1, and an annularly enclosed space defines valve inlet 83c receiving and retaining the liquid such as a sample. Annular valve structure 83-1 has a valve opening 83b for ejecting the liquid incorporated into valve inlet 83c into ejection portion 85. The upper surface of valve structure 83-1 is in contact with first substrate 91, and valve opening 83b is constituted of the lower surface of first substrate 91 and a groove formed in the upper surface of second substrate 93. Therefore, the liquid in valve inlet 83c is ejected into a first ejection channel 85-1 described later only through valve opening 83b. The number of valve opening 83b is not restricted to one but a plurality of valve openings may be provided. Further, the position for forming valve opening 83b is not restricted to that opposed to a second ejection channel 85-2 as shown in FIGS. 8A and 8B. However, valve opening 83b is so formed on the position opposed to second ejection channel 85-2 that the liquid can be efficiently ejected when centrifugal force in a direction from valve opening 83b toward second ejection channel 85-2 is applied to microchip 200, for example.

Ejection portion 85 includes first ejection channel 85-1 enclosing annular valve structure 83-1 and second ejection channel 85-2 downstream first ejection channel 85-1. First ejection channel 85-1 and second ejection channel 85-2 are formed by a groove formed in the upper surface of second substrate 93 and the lower surface of first substrate 91. First ejection channel 85-1 is a channel enclosed with a valve sidewall surface 83a (first channel wall) forming the outer wall surface of valve structure 83-1, an ejection portion sidewall surface 85a (second channel wall), an ejection portion bottom surface 85b and an ejection portion upper surface 85b2. Valve sidewall surface 83a and ejection portion sidewall surface 85a may be separate from each other at such a distance that no liquid propagates from valve sidewall surface 83a to ejection portion sidewall surface 85a through surface tension and capillary attraction, and the distance may be constant or discontinuous. Second ejection channel 85-2 is a channel enclosed with ejection portion sidewall surface 85a opposed to each other, ejection portion bottom surface 85b and ejection portion upper surface 85b2.

The structure including valve 83 shown in this second embodiment may be applied to the microchip according to the first embodiment shown in FIG. 5.

(2) Operation of Valve

The liquid such as a reagent is previously introduced into microchip 200 before use of microchip 200. The liquid introduced into valve inlet 83c through introduction portion 81 is preferably retained in valve inlet 83c during transportation or storage of microchip 200. However, the liquid such as a reagent may flow out from valve inlet 83c toward ejection portion 85, depending on the method of transportation or storage. As hereinabove described, valve 83 is so formed between introduction portion 81 and ejection portion 85 as to connect these portions with each other, whereby the liquid introduced from introduction portion 81 is ejected into ejection portion 85 necessarily through valve 83. In this case, the liquid comes into contact with the inner wall surface of valve structure 83-1, to be retained in valve inlet 83c due to the surface tension on the inner wall surface.

More specifically, the liquid introduced into valve inlet 83c from introduction portion 81 reaches valve openings 83b through the inner wall surface. If having low wettability with a contact angle θ of at least 90°, the liquid is retained in valve inlet 83c due to force acting thereon in a direction for moving from valve opening 83b toward valve inlet 83c through capillary action. If having high wettability with a contact angle θ of less than 90°, on the other hand, the liquid is drawn into valve opening 83b through capillary action since valve opening 83b has a smaller channel width than valve inlet 83c. If the channel section of valve opening 83b is rectangular, valve sidewall surface 83a and ejection portion upper surface 85b2 form corners. The liquid having high wettability is going to spread on the overall corners through these corners due to the surface tension. However, valve sidewall surface 83a (first channel wall) and ejection portion sidewall surface 85a (second channel wall) are separately formed independently of each other through ejection portion bottom surface 85b and ejection portion upper surface 85b2 as hereinabove described, whereby the liquid remains in these corners, and cannot reach ejection portion sidewall surface 85a. Therefore, the liquid introduced from introduction portion 81 into valve inlet 83c is retained in valve inlet 83c, valve opening 83b and/or the corners of valve sidewall surface 83a.

(3) Design of Valve

Figure 9:
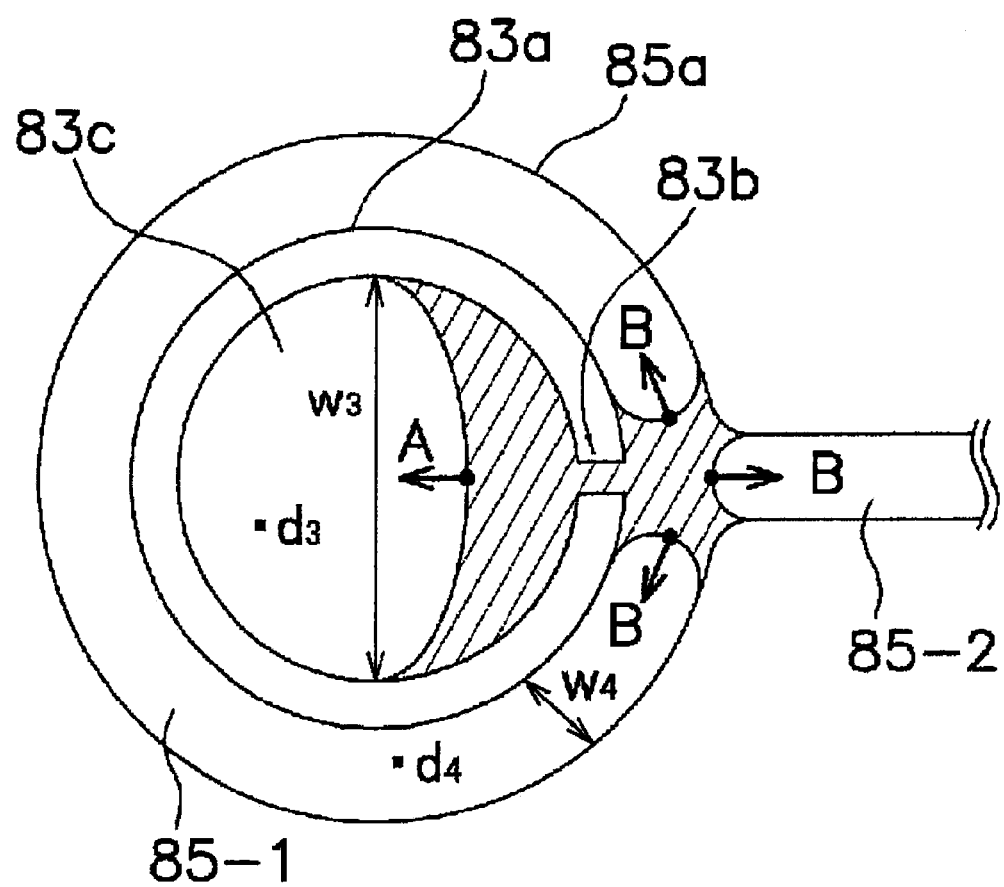
FIG. 9 is an explanatory diagram for illustrating the relation between surface tension of a liquid having a contact angle θ of less than 90° and the dimensions of the valve.

Design of a valve capable of retaining a liquid having a contact angle θ of less than 90° through surface tension is now described. FIG. 9 is an explanatory diagram for illustrating the relation between the surface tension of the liquid having a contact angle θ of less than 90° and the dimensions of the valve.

It is assumed that d3 and w3 represent the depth and the width of the channel section in valve inlet 83c at a point A respectively, and d4 and w4 represent the depth and the width of the channel section in first ejection channel 85-1 at a point B respectively. When these valves are applied to the relational expression (9) calculated in the aforementioned first embodiment, the following relational expression (10) is obtained:

$$\frac{1}{d3} + \frac{1}{w3} > \frac{1}{d4} + \frac{1}{w4} \tag{10}$$

If the width w3 of valve inlet 83c is sufficiently large as compared with the depth d3, the following relational expression (11) is obtained:

$$\frac{1}{d3} > \frac{1}{d4} + \frac{1}{w4} \tag{11}$$

Valve 83 is so designed as to satisfy the above expressions (10) and (11), whereby the liquid having the contact angle θ of less than 90° is not ejected into first ejection channel 85-1 but retained in valve inlet 83c.

(4) Modification

Figures 10A, 10B, 10C:
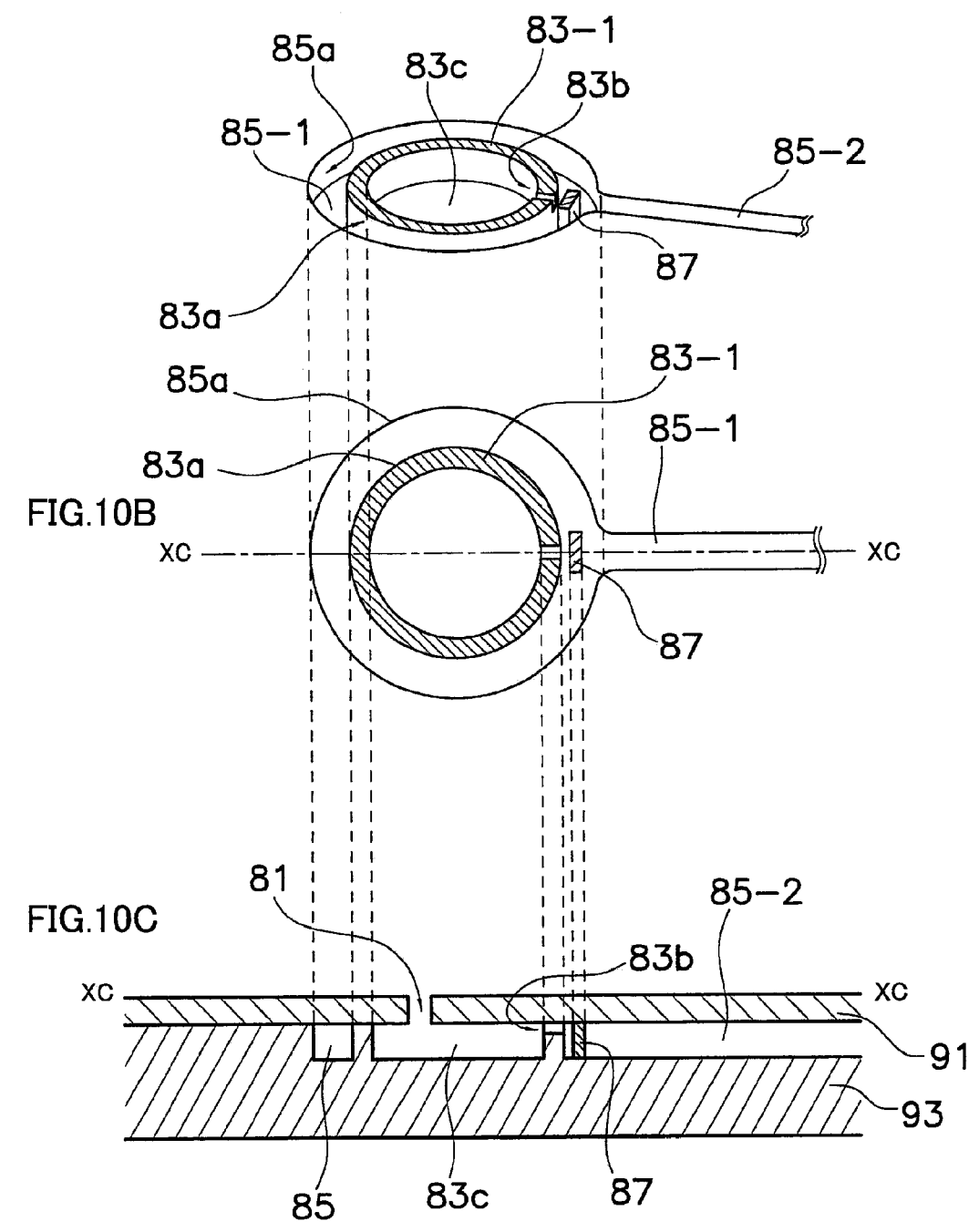

FIGS. 10A to 10C show a modification of microchip 200 according to the second embodiment, and FIG. 10A is a perspective view showing another exemplary structure of the valve in microchip 200 according to the present invention, FIG. 10B is a plan view showing the structure of the valve shown in FIG. 10A, and FIG. 10C is a sectional view taken along the line XC-XC in FIG. 10B. As shown in FIGS. 10A to 10C, a partition 87 may be provided in ejection portion bottom surface 85b of first ejection channel 85-1 on a position opposed to valve opening 83b. The remaining structure is similar to that shown in FIGS. 8A to 8D, and hence redundant description is not repeated.

Figure 11:
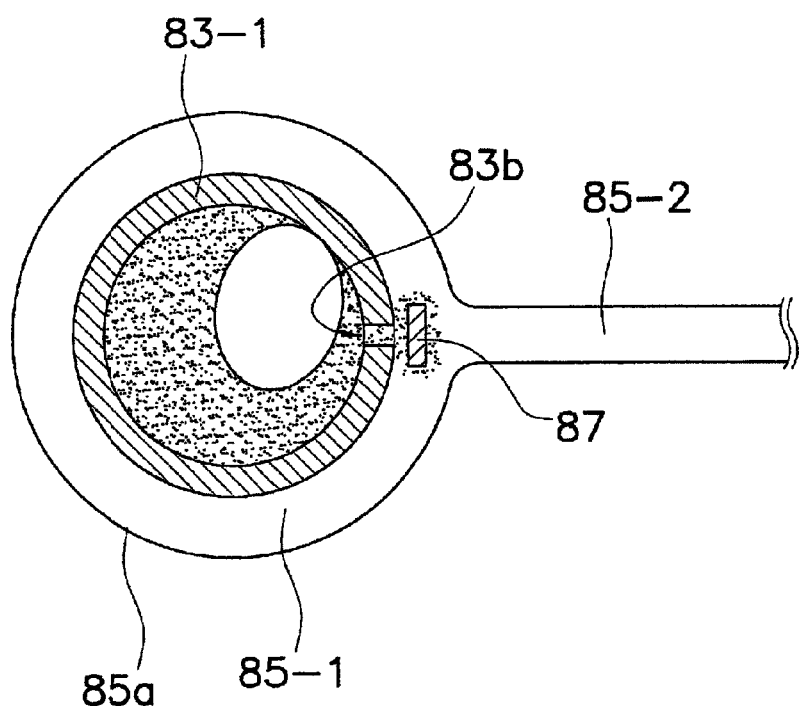
FIG. 11 is an explanatory diagram showing a liquid retained in a valve inlet 83c and a valve opening 83b by a partition 87.

FIG. 11 is an explanatory diagram showing a liquid retained in valve inlet 83c and valve opening 83b by partition 87. As shown in FIG. 11, the liquid flowing out from valve inlet 83c into first ejection channel 85-1 through valve opening 83b is prevented by partition 87 and cannot reach ejection portion sidewall surface 85a. At this time, the liquid flowing out from valve opening 83b is attracted to partition 87 by surface tension, for example.

The distance between valve opening 83b and partition 87 is not particularly restricted so far as the liquid can be retained in valve inlet 83c by partition 87.

Partition 87 may be provided in response to the number of valve opening 83b, or may be provided only in valve opening 83b on the position opposed to second ejection channel 85-2.

(5) Manufacturing Method

Figure 12:
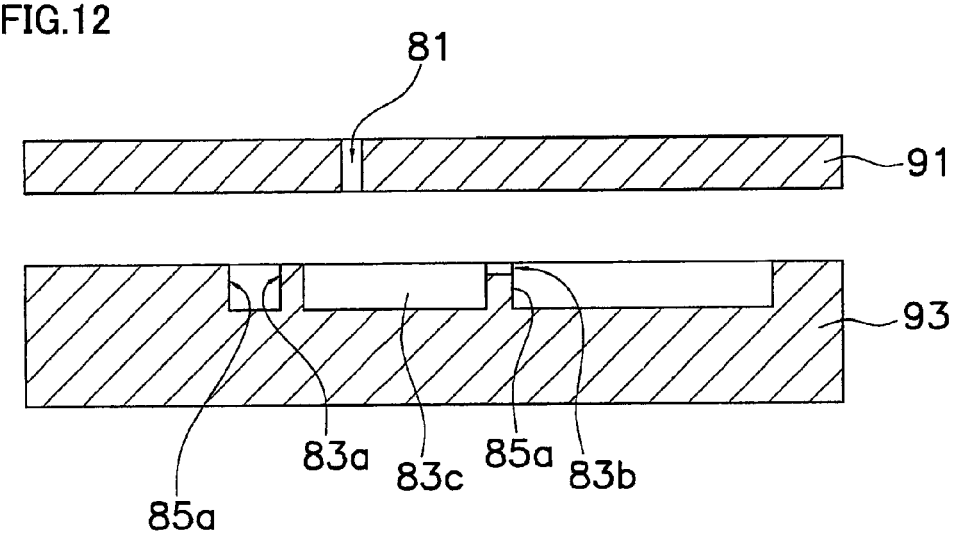
FIG. 12 is an explanatory diagram showing a method of manufacturing microchip 200 having a valve 83.

A method of manufacturing microchip 200 having the aforementioned valve 83 is now described. FIG. 12 is an explanatory diagram showing the method of manufacturing microchip 200 having valve 83. While FIG. 12 shows only a method of manufacturing a portion around valve 83, the remaining channels, vessel and reservoirs are also similarly formed. The method of manufacturing microchip 200, similar to that in the first embodiment, is now briefly described.

Valve 83 and ejection portion 85 are formed in second substrate 93 by injection molding, and introduction portion 81 is formed in first substrate 91 by injection molding for topping microchip 200. These first and second substrates 91 and 93 are bonded to each other, thereby completing microchip 200.

(6) Function/Effect

Thus, microchip 200 according to the second embodiment attains function/effect similar to that of the first embodiment. This is now briefly described.

The liquid such as a reagent introduced into valve inlet 83c in microchip 200 is not ejected into ejection portion 85 before use of the chip during transportation or storage. Further, valve 83 can not only retain the liquid in valve inlet 83c before use but also prevent backflow of the liquid from ejection portion 15 into valve inlet 83c. Particularly when a liquid having high wettability with a contact angle θ of less than 90° is introduced into the microchip, passage and retention of the liquid can be simply and accurately controlled by applying the aforementioned valve 83 to the microchip.

The liquid is gradually increased in wettability and the contact angle thereof is reduced with the elapse of time, whereby a hydrophilic valve such as that according to the present invention, applicable to both of a liquid having high wettability and a liquid increased in wettability with the elapse of time, is more preferable.

The microchip can be manufactured through simple manufacturing steps, whereby the manufacturing cost can be reduced as a result. In particular, the valve can be simply formed with only two substrates in microchip 200 according to the second embodiment, whereby simplification of the manufacturing steps, reduction of the manufacturing cost, miniaturization of the microchip etc. can be attained.

Third Embodiment (1) Structure around Valve

FIGS. 13A to 13D are explanatory diagrams around a valve of a microchip 300 according to the present invention, and FIG. 13A is a perspective view showing the structure of the valve in microchip 300 according to the present invention,
FIG. 13B is a plan view showing the structure of the valve shown in FIG. 13A, FIG. 13C is a sectional view taken along the line XIIIC-XIIIC in FIG. 13B, and FIG. 13D is a sectional view taken along the line XIIID-XIIID in FIG. 13B.

Microchip 300 according to the present invention shown in FIGS. 13A to 13D is formed by three substrates, similarly to the first embodiment. More specifically, microchip 300 is formed by a first substrate 111, a second substrate 113 and a third substrate 115, and includes an introduction portion 101 receiving a liquid such as a sample or a reagent, an ejection portion 105 into which the liquid is ejected and a valve 103 connecting introduction portion 101 and ejection portion 105 with each other.

Introduction portion 101 has a channel body 101a and a channel outlet 101b. The sample, the reagent or the like can be introduced into channel body 101a from outside microchip 300 through an unillustrated channel inlet. The sidewall surface, the bottom surface and the upper surface of channel body 101a are formed by a channel formed on the lower surface of second substrate 113 and the upper surface of third substrate 115. Channel outlet 101b is so formed as to pass through second substrate 113, and connected to a valve inlet 103c described later.

Valve 103 is formed by a three-cornered triangular valve structure 103-1. Valve inlet 103c is formed by a space enclosed with the inner wall of triangular valve structure 103-1, and this space is connected with channel outlet 101b. Therefore, valve inlet 103c can retain the liquid introduced from channel outlet 101b. Further, triangular valve structure 103-1 has a valve opening 103b for ejecting the liquid incorporated into valve inlet 103c into ejection portion 105 in one of the apices thereof. The upper surface of valve structure 103-1 is in contact with first substrate 111, and valve opening 103b is constituted of the lower surface of first substrate 111 and a groove formed in the upper surface of second substrate 113. Therefore, the liquid in valve inlet 103c is ejected into a first ejection channel 105-1 described later only through valve opening 103b.

The number of valve opening 103b is not restricted to one but a plurality of valve openings may be provided. Further, the position for forming valve opening 103b is not restricted to that opposed to a second ejection channel 105-2 as shown in FIGS. 13A and 13B. However, valve opening 103b is so formed on the position opposed to second ejection channel 105-2 that the liquid can be efficiently ejected when centrifugal force in a direction from valve opening 103b toward second ejection channel 105-2 is applied to microchip 300, for example.

Ejection portion 105 includes first ejection channel 105-1 enclosing valve 103 and second ejection channel 105-2 downstream first ejection channel 105-1. First and second ejection channels 105-1 and 105-2 are formed by a groove formed in the upper surface of second substrate 113 and the lower surface of first substrate 111. First ejection channel 105-1 is a channel enclosed with a valve sidewall surface 103a (first channel wall) forming the outer wall surface of valve structure 103-1, an ejection portion sidewall surface 105a (second channel wall), an ejection portion bottom surface 105b and an ejection portion upper surface 105b2. Valve sidewall surface 103a and ejection portion sidewall surface 105a may separate from each other at such a distance that no liquid propagates from valve sidewall surface 103a to ejection portion sidewall surface 105a through surface tension and capillary attraction, and the distance may be constant or discontinuous. Second ejection channel 105-2 is a channel enclosed with ejection portion sidewall surface 105a opposed to each other, ejection portion bottom surface 105b and ejection portion upper surface 105b2.

(2) Operation of Valve

The liquid such as a reagent may be previously introduced into microchip 300 before use of microchip 300. Even if the liquid is introduced into valve inlet 103c through introduction portion 101 during transportation or storage, the liquid is preferably retained in valve inlet 103c. However, the liquid may flow out from valve inlet 103c toward ejection portion 105 depending on the method of transportation or storage. As hereinabove described, valve 103 is so formed between introduction portion 101 and ejection portion 105 as to connect these portions with each other, whereby the liquid introduced from introduction portion 101 is ejected into ejection portion 105 necessarily through valve 103. In this case, the liquid comes into contact with the inner wall surface of valve structure 103-1, to be retained in valve inlet 103c due to the surface tension on the inner wall surface. Further, valve sidewall surface 103a and ejection portion sidewall surface 105a are separately formed independently of each other through ejection portion bottom surface 105b. Even if a liquid having high wettability with a contact angle θ of less than 90° is introduced into the microchip, therefore, the liquid remains in corners of valve sidewall surface 103a, ejection portion bottom surface 105b and ejection portion upper surface 105b2, not to reach ejection portion sidewall surface 105a. Also when introduced from introduction portion 101 into valve inlet 103c, therefore, the liquid is retained in valve inlet 103c, valve opening 103b and/or the corners of valve sidewall surface 103a.

(3) Methods of Designing and Manufacturing Valve

Methods of deciding the dimensions of and manufacturing valve 103 are similar to those of the aforementioned first and second embodiments, and hence redundant description is not repeated.

(4) Function/Effect

Thus, microchip 300 according to the third embodiment attains function/effect similar to those of the first and second embodiments. This is now briefly described.

The liquid such as a reagent introduced into valve inlet 103c in microchip 300 is not ejected into ejection portion 105 before use of the chip during transportation or storage. Further, valve 103 can not only retain the liquid in introduction portion 101 before use but also prevent backflow of the liquid from ejection portion 105 into introduction portion 101. Particularly when a liquid having high wettability with a contact angle θ of less than 90° is introduced into the microchip, passage and retention of the liquid can be simply and accurately controlled by applying the aforementioned valve 103 to the microchip. Further, the microchip can be manufactured through simple manufacturing steps, whereby the manufacturing cost can be reduced as a result.

The liquid is gradually increased in wettability and the contact angle thereof is reduced with the elapse of time, whereby a hydrophilic valve such as that according to the present invention, applicable to both of a liquid having high wettability and a liquid increased in wettability with the elapse of time, is more preferable.

Further, first and second ejection channels 105-1 and 105-2 are so formed in shapes similar to Y-shapes that the liquid hardly remains in the ejection channel when ejected into ejection portion 105.

Other Embodiments (a)

Figure 14:
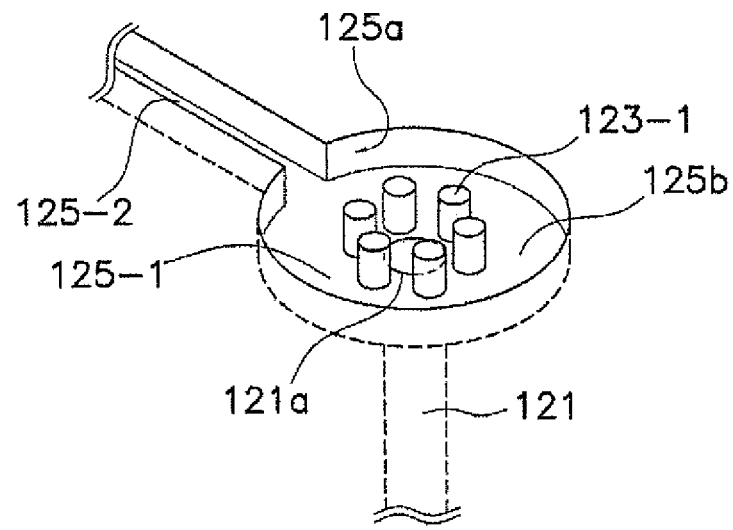
FIG. 14 is a perspective view showing further exemplary valve structures.

FIG. 14 is a perspective view showing further exemplary valve structures. While the valve is constituted of the sectorial valve structures in the first embodiment, the shape of the valve structures is not restricted to this. For example, a valve may be constituted of a plurality of columnar valve structures such as those shown in FIG. 14. The valve is constituted of the plurality of valve structures thereby increasing surfaces areas and further increasing the surface tension, so that no liquid can be ejected into an ejection portion. Referring to FIG. 14, an ejection portion 125 includes a first ejection channel 125-1 and a second ejection channel 125-2. An introduction outlet 121a of an introduction portion 121 is so formed as to open in an ejection portion bottom surface 125b of first ejection channel 125-1. A valve 123 is constituted of a plurality of columnar valve structures 123-1, and valve structures 123-1 are so provided on ejection portion bottom surface 125b as to enclose introduction outlet 121a. A liquid introduced into valve 123 from introduction portion 121 is retained in clearances between valve structures 123-1 due to surface tension. The liquid can be retained since valve structures 123-1 are separately formed independently of an ejection portion sidewall surface 125a of first ejection channel 125-1 through ejection portion bottom surface 125b.

(b)

Figure 15:
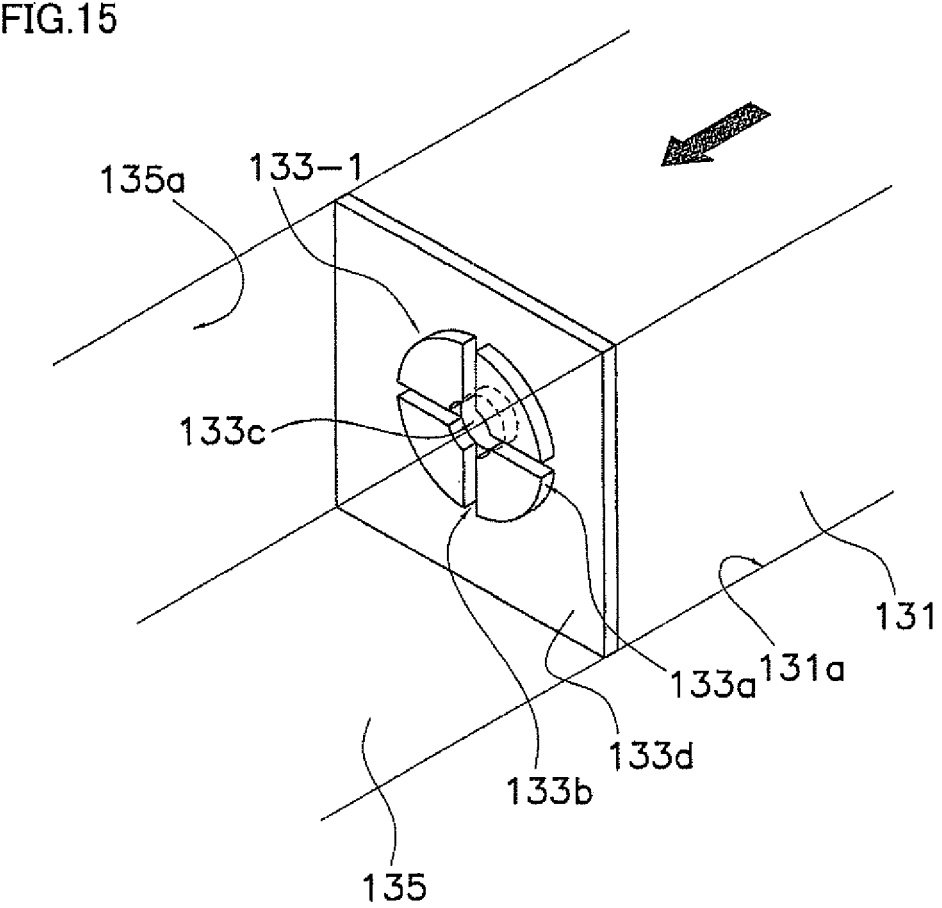
FIG. 15 is an explanatory diagram showing a further exemplary valve mounting position.
Figure 16:
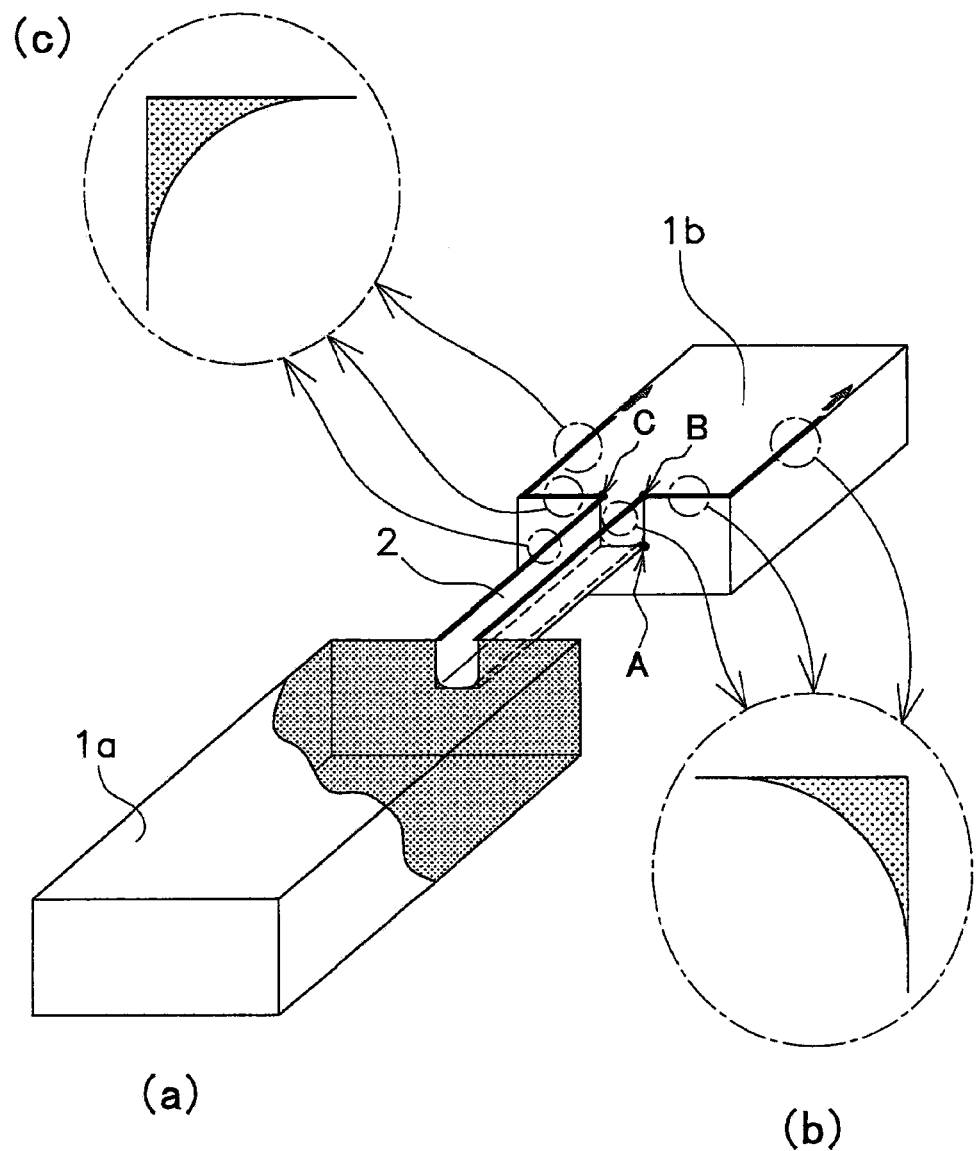
FIG. 16(a) shows an exemplary valve described in National Patent Publication Gazette No. 2001-503854.
FIGS. 16(b) and 16(c) are enlarged diagrams showing a liquid moving along corners between wall surfaces of the valve shown in FIG. 16(a).

FIG. 15 is an explanatory diagram showing a further exemplary position for mounting a valve. According to the first embodiment, the ejection portion and the introduction portion are formed to be in vertical relation to each other. In other words, the valve is so arranged that the valve inlet vertically passes through the substrates. Alternatively, a valve may be arranged in a manner rotated by 90 degrees as compared with FIGS. 1A to 1D so that an ejection portion and an introduction portion are in horizontal direction to each other, as shown in FIG. 15. Referring to FIG. 15, an introduction portion 131 is so formed as to horizontally extend with reference to a substrate, and an ejection portion 135 is so formed as to extend in the extensional direction of introduction portion 131. A valve 133 is constituted of a plurality of valve structures 133-1. Valve structures 133-1 are formed on a valve base substrate 133d, to protrude toward ejection portion 135. A valve inlet 133c is so formed on valve base substrate 133d as to pass through valve base substrate 133d. Valve openings 133b are formed in clearances between the plurality of valve structures 133-1, and a liquid is ejected from introduction portion 131 into ejection portion 135 through valve openings 133b.

If introduced from introduction portion 131 into valve inlet 133c, the liquid is retained in valve 133 due to surface tension on valve sidewall surfaces 133a forming the outer wall surfaces of valve structures 133-1 and valve openings 133b. This is because valve sidewall surfaces 133a of valve structures 133-1 and an ejection portion sidewall surface 135a of ejection portion 135 are separately formed independently of each other through valve base substrate 133d.

(c)

Also in the first embodiment, the partition according to the second embodiment shown in FIGS. 10A to 10C may be provided in ejection portion bottom surface 15b of first ejection channel 15-1 on a position opposed to valve openings 13b. Also in the third embodiment, a partition may be provided in ejection portion bottom surface 105b of first ejection channel 105-1 on a position opposed to valve opening 103b.

(d)

In the aforementioned first embodiment, the depth d1 of the channel section in valve openings 13b and the depth d2 of the channel section in first ejection channel 15-1 are different from each other. Alternatively, the depths d1 and d2 may be identical to each other.

(e)

While a sample such as whole blood or plasma, a reagent employed for analysis or the like can be listed as the liquid introduced into the microchip, the present invention is not restricted to these.

(f)

The detection method is not restricted to an optical detection method but an electrochemical detection method may be employed, for example.

The present invention can be utilized for various substrates applicable to gas, a liquid etc. referred to as a clinical analysis chip, an environmental analysis chip, a gene analysis chip (DNA chip), a protein analysis chip (proteome chip), a sugar chain chip, a chromatograph chip, a cell analysis chip, a pharmaceutical screening chip and the like used in the fields of medical care, food, pharmaceuticals and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microchip comprising:
   an introduction portion introducing a liquid;
   an ejection portion ejecting the liquid; and
   a valve connecting the introduction portion and the ejection portion with each other and retaining the liquid so that surface tension of the liquid prevents the liquid from ejection into the ejection portion, wherein
   said valve has a first channel wall that is a side wail surface of the valve, said first channel wall having at least one opening ejecting said liquid into said ejection portion,
   said ejection portion has a second channel wall disposed such that the second channel wall at least partially surrounds the first channel wall and the second channel wall is entirely separate from the first channel wall, and
   a channel between said first channel wall and said second channel wall at least partially forms said ejection portion.

2. The microchip according to claim 1, wherein said opening is so sized as not to eject said liquid into said ejection portion through surface tension.

3. The microchip according to claim 1, wherein the width of said opening is smaller than the channel width of said channel between said first channel wall and said second channel wall.

4. The microchip according to claim 1, wherein said channel between said first channel wall and said second channel wall is provided with a partition on a position opposite to at least one said opening.

5. The microchip according to claim 1, wherein said valve is composed of a plurality of structures, and said liquid is retained on the surfaces of said structures and/or between said structures.

6. The microchip according to claim 1, wherein said first channel wall of said valve is formed by an annular channel wall, and said liquid is retained in a space enclosed with said first channel wall.

7. The microchip of claim 1 wherein at least respective portions of the first and second walls are substantially concentric.

8. The microchip according to claim 1 wherein:
   the first channel wall of the valve has at least two openings, and
   the second channel wall is separate from each portion of the first channel wall forming each of the at least two openings.

9. The microchip according to claim 1 wherein the valve is configured such that a Laplace pressure $P_A$ through surface tension of the liquid presented in the opening is larger than a Laplace pressure $L_B$ through surface tension of the liquid presented in the channel between the first channel wall and the second channel wall, to retain the liquid in the valve when the liquid may be introduced into the opening of the valve through the introduction portion and further reaches the second channel wall of the ejection portion.

10. A method of using the microchip according to claim 1, comprising:
    introducing a liquid into said microchip; and
    applying centrifugal force larger than the surface tension of said liquid by rotating the microchip about an axis of rotation for ejecting said liquid from said introduction portion into said ejection portion.

* * * * *